United States Patent
Fetcenko et al.

(10) Patent No.: US 7,393,500 B2
(45) Date of Patent: *Jul. 1, 2008

(54) HYDROGEN STORAGE ALLOYS HAVING IMPROVED CYCLE LIFE AND LOW TEMPERATURE OPERATING CHARACTERISTICS

(75) Inventors: Michael A. Fetcenko, Rochester, MI (US); Kwo Young, Troy, MI (US); Stanford R. Ovshinsky, Bloomfield Hills, MI (US); Taihei Ouchi, Rochester, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 366 days.

This patent is subject to a terminal disclaimer.

(21) Appl. No.: 10/817,267

(22) Filed: Apr. 2, 2004

(65) Prior Publication Data

US 2004/0219053 A1 Nov. 4, 2004

Related U.S. Application Data

(63) Continuation-in-part of application No. 10/405,008, filed on Apr. 1, 2003, now Pat. No. 6,830,725.

(51) Int. Cl.
*C22C 30/00* (2006.01)
*H01M 4/38* (2006.01)
(52) U.S. Cl. ............... 420/580; 420/900; 429/218.1
(58) Field of Classification Search ............... 420/455, 420/900, 580; 429/218.2, 218.1
See application file for complete search history.

(56) References Cited

U.S. PATENT DOCUMENTS

| | | | |
|---|---|---|---|
| 4,487,817 A * | 12/1984 | Willems et al. | 429/27 |
| 4,716,088 A | 12/1987 | Reichman et al. | |
| 5,512,385 A * | 4/1996 | Komori et al. | 429/101 |
| 5,536,591 A | 7/1996 | Fetcenko et al. | |
| 5,738,953 A | 4/1998 | Lichtenberg et al. | |
| 6,106,768 A | 8/2000 | Lee et al. | |
| 6,270,719 B1 | 8/2001 | Fetcenko et al. | |
| 6,329,100 B1 | 12/2001 | Imoto et al. | |
| 6,331,367 B1 | 12/2001 | Ebihara et al. | |
| 6,830,725 B2 * | 12/2004 | Fetcenko et al. | 420/580 |
| 2004/0159377 A1 * | 8/2004 | Takamaru et al. | 148/513 |

* cited by examiner

*Primary Examiner*—Roy King
*Assistant Examiner*—Ngoclan T Mai
(74) *Attorney, Agent, or Firm*—David W. Schumaker

(57) ABSTRACT

Electrochemical and gas phase hydrogen storage alloy compositions that provide superior performance, especially at low temperature, and excellent cycle life characteristics. The alloys of this invention are $AB_5$ type alloys that include a cycle life enhancement element and a low Co concentration. The preferred cycle life enhancement elements include Zr and Si. The cycle life enhancement elements increase the cycle life of the instant alloys by reducing the pulverization of alloy particles upon repeated cycles of charging-discharging or hydriding-dehydriding. The alloys are characterized by low hysteresis on cycling, where hysteresis is measured in terms of mass concentration difference, a parameter related to the activation energy associated with the incorporation of hydrogen into the alloy. The instant alloys are designed to have a low activation energy for hydrogen incorporation and as a result, provide low hysteresis and a more uniform concentration of absorbed hydrogen within the material. As a result, differential lattice expansion effects associated with the absorption of hydrogen are minimized and the tendency for particle pulverization on cycling is minimized. Alloys having a low Co concentration and long cycle life are thus provided for.

41 Claims, 17 Drawing Sheets

Ovonic Ni-MH C Cell

"B" AB5 Pasted Negative Electrode

Ovonic Ni-MH C Cell
"B1" AB5 Pasted Negative Electrode

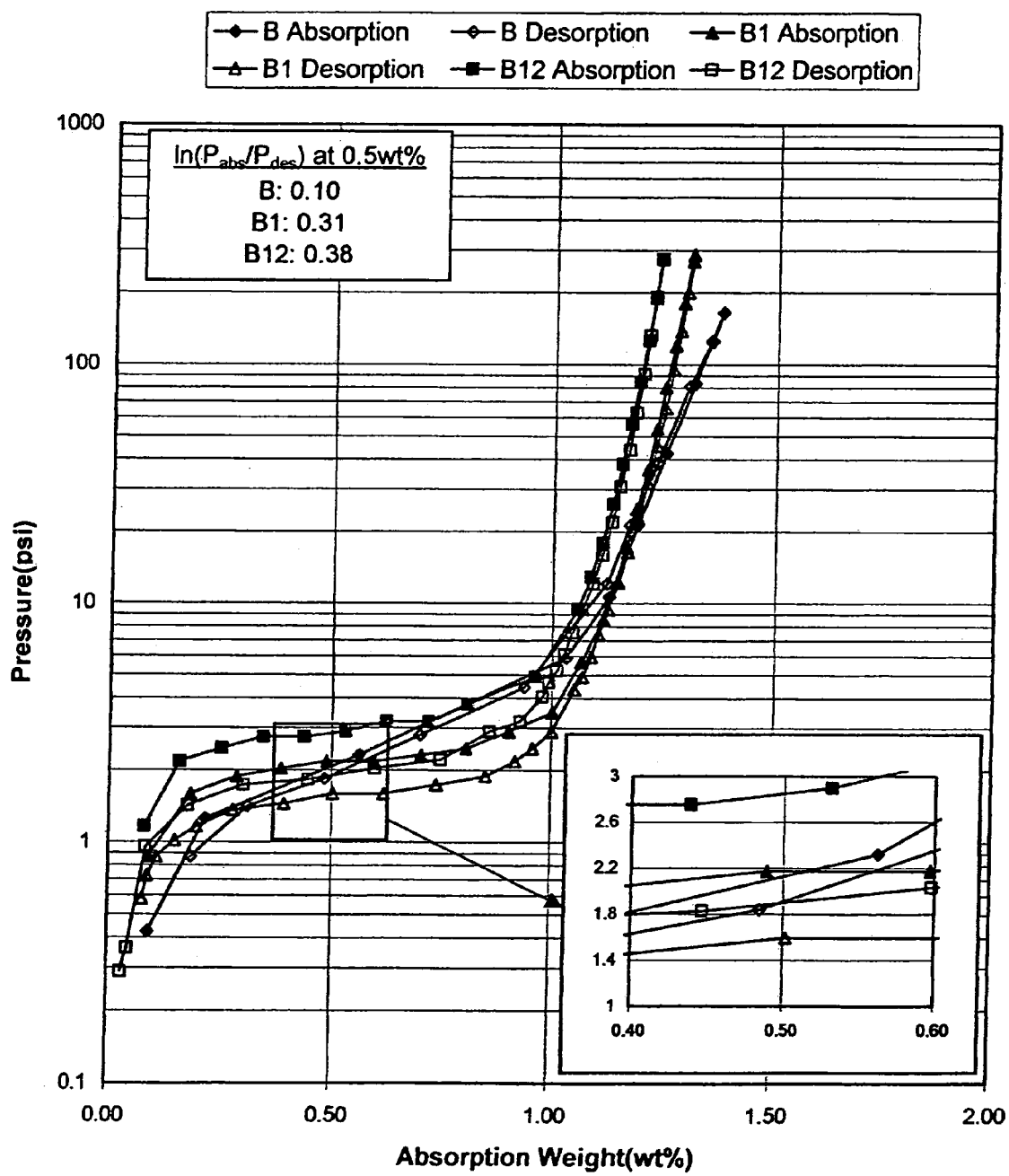

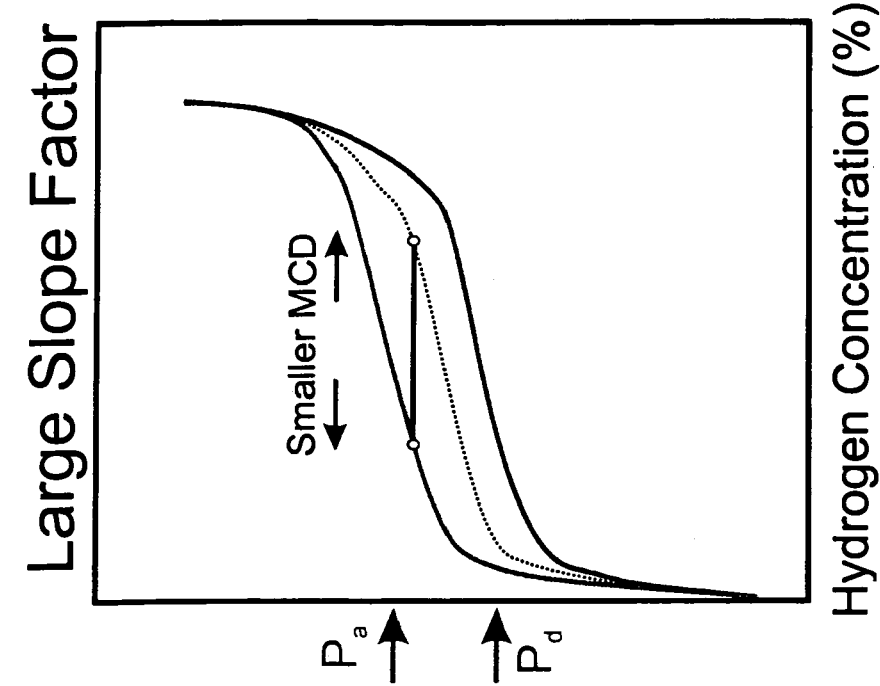
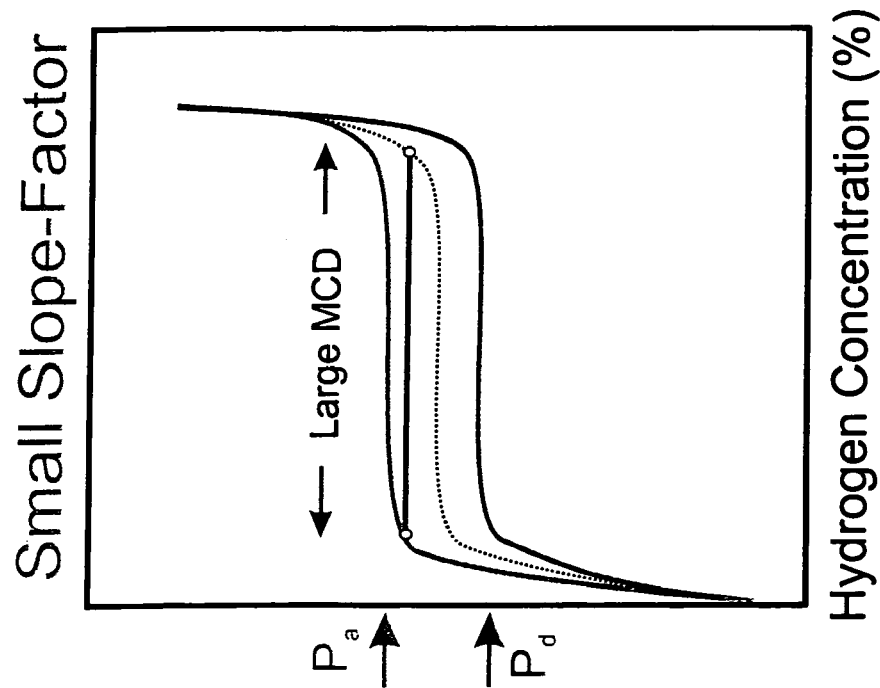
Fig. 6

PCT Measurement Result at 30°C
AB5 Material with Low Zr

PCT Measurement Result at 30°C
AB5 Material with High Zr

Fig. 13
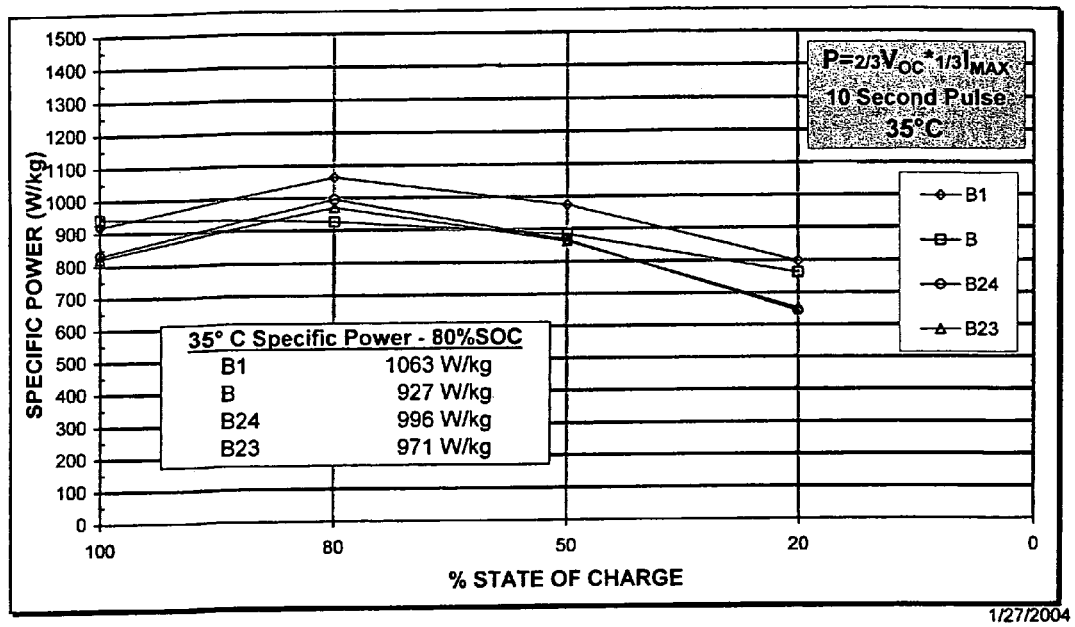
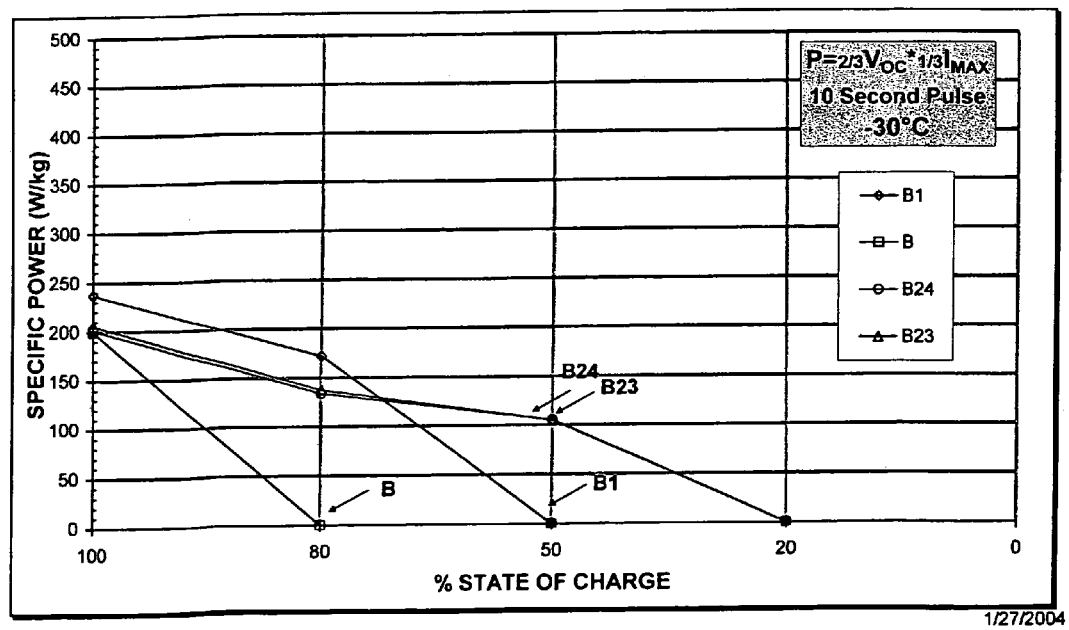

HYDROGEN STORAGE ALLOYS HAVING IMPROVED CYCLE LIFE AND LOW TEMPERATURE OPERATING CHARACTERISTICS

RELATED APPLICATION INFORMATION

This application is a continuation in part of U.S. patent application Ser. No. 10/405,008, filed on Apr. 1, 2003 now U.S. Pat. No. 6,830,725 and entitled "Hydrogen Storage Alloys having a High Porosity Surface Layer", the disclosure of which is hereby incorporated by reference herein.

FIELD OF THE INVENTION

The instant invention pertains to hydrogen storage alloys as well as to electrochemical cells, batteries and fuel cells using these alloys. More particularly, the instant invention relates to hydrogen storage alloys suitable for operation at low temperature conditions. Most particularly, the instant invention relates to hydrogen storage alloys suitable for use as negative electrode materials in metal hydride batteries that provide high powers, high discharge rates and long cycle life at low operating temperatures.

BACKGROUND OF THE INVENTION

Consumer and industrial applications continue to drive demand for new and efficient batteries for use as energy sources. Important goals include obtaining ever more power from increasingly smaller battery packages in an environmentally respectful fashion. Envisioned applications for batteries include everything from mobile electronics to electric vehicles. Portability, rechargeability over a large number of cycles, low cost, high power, lightweight and consistent performance over widely varying loads are among the key attributes required for batteries. The specific combination of battery performance requirements varies widely with the intended application and the battery components and materials are typically optimized accordingly.

An important developing application area for rechargeable batteries is electric vehicles (EV) and hybrid electric vehicles (HEV). In these applications, the battery must have the ability to provide high currents in short time periods in order to achieve effective acceleration. High discharge rates are therefore necessary. High battery power over extended time periods are also needed so that vehicles of reasonable size and weight can be maintained in motion for reasonable time intervals without recharging. Rapid recharging over many cycles should also be possible using readily available electrical power sources. The preferred cycle life profile also requires a high number of charge/discharge cycles at a shallow depth of charge/discharge. Progress has been made in the development of batteries for HEV applications and a few HEV automobiles have recently been made available to the U.S. public. Nonetheless, the batteries used in these automobiles represent compromises and trade-offs in relevant performance parameters and new developments are needed to further the capabilities of HEV and EV products.

Nickel metal hydride batteries have emerged as the leading class of rechargeable batteries and are replacing earlier generation nickel-cadmium batteries in many applications. Relative to nickel cadmium batteries, nickel metal hydride batteries avoid significant environmental problems (due to the toxicity of cadmium) while providing higher energy densities. HEV and EV products are examples of applications that utilize the high energy density available from nickel metal hydride batteries and are also applications viewed to be impractical in a nickel-cadmium paradigm due to the disposal problems associated with cadmium. Expanded performance of HEV and EV products and the future extension of rechargeable batteries to new applications in the future will greatly depend on improvements in the capabilities of nickel metal hydride batteries.

Nickel metal hydride batteries typically include a nickel hydroxide positive electrode, a negative electrode that incorporates a metal-containing hydrogen storage alloy, a separator made from nylon, polypropylene or other polymers, and an aqueous alkaline electrolyte. The positive and negative electrodes are housed in adjoining battery compartments that are typically separated by a non-woven, felled, nylon or polypropylene separator. Several batteries may also be combined in parallel or series to form larger battery packs capable of providing higher powers, voltages or discharge rates.

The charging and discharging reactions of nickel metal hydride batteries have been discussed in the art and may be summarized as shown below:

Charging:
positive electrode: $Ni(OH)_2 + OH^- \rightarrow NiOOH + H_2O + e^-$
negative electrode: $M + H_2O + e^- \rightarrow MH + OH^-$ Discharging:
positive electrode: $NiOOH + H_2O + e^- \rightarrow Ni(OH)_2 + OH$
negative electrode: $MH + OH^- \rightarrow M + H_2O + e^-$ Much work has been completed over the past decade to improve the performance of nickel metal hydride batteries. Optimization of the batteries ultimately depends on controlling the rate, extent and efficiency of the charging and discharging reactions. Factors relevant to battery performance include the physical state, chemical composition, catalytic activity and other properties of the positive and negative electrode materials, the composition and concentration of the electrolyte, the separator, the operating conditions, and external environmental factors. Various factors related to the performance of the positive nickel hydroxide electrode have been considered, for example, in U.S. Pat. Nos. 5,348,822; 5,637,423; 5,905,003; 5,948,564; and 6,228,535 by the instant assignee, the disclosures of which are hereby incorporated by reference.

Work on suitable negative electrode materials has focused on intermetallic compounds as hydrogen storage alloys since the late 1950's when it was determined that the compound TiNi reversibly absorbed and desorbed hydrogen. Subsequent work has shown that intermetallic compounds having the general formulas AB, $AB_2$, $A_2B$ and $AB_5$, where A is a hydride forming element and B is a weak or non-hydride forming element, are able to reversibly absorb and desorb hydrogen. Consequently, most of the effort in developing negative electrodes has focused on hydrogen storage alloys having the AB, $AB_2$, $AB_5$ or $A_2B$ formula types.

Desirable properties of hydrogen storage alloys include: good hydrogen storage capabilities to achieve a high energy density and high battery capacity; thermodynamic properties suitable for the reversible absorption and desorption of hydrogen at room temperature; low hydrogen equilibrium pressure; high electrochemical activity; fast discharge kinetics for high rate performance; high oxidation resistance; weak tendency to self-discharge; and reproducible performance over many cycles. The chemical composition, physical state, electrode structure and battery configurations of hydrogen storage alloys as negative electrode materials in nickel metal hydride have been investigated and reported in the prior art. Some of this work is described in U.S. Pat. Nos. 4,716,088; 5,277,999;

5,536,591; 5,616,432; and 6,270,719 to the instant assignee, the disclosures of which are hereby incorporated by reference.

Efforts to date indicate that intermetallic compounds are capable of effectively functioning as negative electrode materials in rechargeable batteries, but that important properties are difficult to optimize simultaneously. Hydrogen storage alloys of the $AB_5$ type, for example, generally have high initial activation, good charge stability and relatively long charge-discharge cycle life, but at the same time have low discharge capacity. Furthermore, attempts to increase the cycle life generally lead to reductions in the initial activation. Hydrogen storage alloys of the $AB_2$ type, on the other hand, typically possess high discharge capacity, but frequently suffer from low initial activation and relatively short cycle life. Although recent achievements in atomic engineering are improving the situation, efforts to improve upon the initial activation customarily have come at the expense of cycle life. Other important properties include discharge rate, discharge current, and constancy of output over time. It has proven difficult in most applications to simultaneously optimize all desired battery attributes and as a result, compromises are normally made in which some properties are sacrificed at the expense of others.

One aspect of rechargeable batteries for HEV, EV, 42V SLI and other applications that has received relatively little attention is low temperature operation. For HEV and EV products it is desirable to have batteries that perform well in harsh winter climates. Similarly, achievement of portable and stationary power sources based on rechargeable batteries that are capable of functioning outdoors in cold climates or in indoor cold environments is also desirable. A basic limitation of virtually every battery technology is a diminution of power and performance at low temperature. The deleterious effects of temperature are especially pronounced below freezing. Like other rechargeable batteries, nickel metal hydride batteries suffer significant degradation in power and performance upon a lowering of temperature. Improvements in the low temperature performance require consideration of the underlying components and principles of operation of nickel metal hydride batteries.

A need exists for improved rechargeable batteries having higher powers and discharge rates at low temperatures. With respect to nickel metal hydride batteries, the barrier to low temperature performance appears to reside primarily in the operating characteristics of the negative hydrogen storage alloy electrode. In U.S. patent application Ser. No. 10/405,008 ('008 application), the disclosure of which is hereby incorporated by reference herein, modifications of nickel metal hydride electrode materials designed to improve the performance under low temperature conditions were disclosed. The '008 application teaches techniques for controlling the porosity of the interface region of nickel metal hydride electrode materials to improve the accessibility of electrochemically active species to catalytic sites. The porosity modifications of the '008 application were motivated by a hypothesis that the ability of electrochemical reactants to reach catalytic sites and the ability of electrochemical products to depart from catalytic sites could be improved by increasing the porosity of the oxide or other matrix supporting the catalytic metal (e.g. nickel) particles utilized in the electrochemical charging and discharging reactions of nickel metal hydride batteries. By increasing the porosity, it was believed that the migration or mobility of electrochemical reactants and products to and away from the catalytic sites could be facilitated, thereby leading to improved performance. Such facilitation was expected to be especially important at conditions utilizing low operating temperatures since these conditions naturally impede the mobility of molecular and ionic species present in electrolyte solution. The materials of the '008 application were shown to exhibit much improved power and discharge rates at low temperatures (e.g. −30° C.). Pertinent details of the materials of the '008 application as they pertain to the instant invention are described hereinbelow.

In addition to high power and high discharge rates, it is desirable to develop a nickel metal hydride negative electrode material having the maximum possible cycle life while still maintaining good overall properties, including low temperature power capability. A need exists to understand the cycle life limitations of metal alloys and to overcome them through new alloy compositions and/or further engineering of alloy microstructure.

SUMMARY OF THE INVENTION

The instant invention provides hydrogen storage alloys that, when included as the active component of a negative electrode in a nickel metal hydride battery, lead to batteries having improved cycle life characteristics. In a preferred embodiment, the instant hydrogen storage alloys provide long cycle life and operability at low temperatures. In a particularly preferred embodiment, the instant invention provides metal hydride alloys that provide a high discharge rate and/or high power at low operating temperatures while providing steady capacity over a large numbers of charge-discharge cycles in a rechargeable battery. The instant alloys may also be utilized as thermal or gas phase hydrogen storage alloys and in fuel cells.

The alloys of the instant invention offer superior cycle life characteristics by providing materials that show a reduced tendency to pulverize upon repeated charge-discharge or hydriding-dehydriding cycling. The instant alloys achieve reduced pulverization by reducing the energy barrier associated with the incorporation of hydrogen into the alloy. As the barrier to hydrogen incorporation is reduced, the gradient in the concentration of absorbed hydrogen is also reduced. As a result, the differential in lattice expansion between adjacent regions in the alloys upon hydrogen absorption is reduced. This leads to a reduction in the stresses between regions that contribute to the shearing, breakdown or degradation of alloy particles. Pulverization is accordingly reduced and alloy particle size accordingly decreases at a more gradual rate upon cycling. The energy barrier underlying pulverization can be assessed through the hysteresis of the alloy in a PCT (pressure-composition-temperature) diagram. The instant inventors introduce maximum concentration difference as a measure of hysteresis and show that low maximum concentration difference correlates with reduced pulverization. In a preferred embodiment, the maximum concentration difference is less than 0.25 wt. % absorbed hydrogen. In another preferred embodiment, the maximum concentration difference is less than 0.20 wt. % absorbed hydrogen. In a more preferred embodiment, the maximum concentration difference is less than 0.15 wt. % absorbed hydrogen. In a most preferred embodiment, the maximum concentration difference is less than 0.10 wt. % absorbed hydrogen.

The instant alloys include modified forms of base alloys from the $AB_5$ families of hydrogen storage materials, where component A is a transition metal, rare earth element or combination thereof and component B is a transition metal element, Al or combination thereof. Representative examples of component A include La, Ce, Pr, Nd, and combinations thereof including mischmetal as a preferred embodiment.

Representative examples of component B include Ni, Co, Mn, Al and combinations thereof. The advantageous cycle life characteristics of the instant alloys are achieved through modification of a base $AB_5$ alloy through the inclusion of a cycle life enhancement element. Zr and Si are the preferred cycle life enhancement elements. The instant inventors show that modified alloys including Zr and Si additives to a copper containing AB5 alloy provide low hysteresis and reduced pulverization and thus promote long cycle life.

In one preferred embodiment, the instant alloys include a cycle life enhancement element in the presence of a reduced Co concentration. Co has been used as a modifier in the prior art to promote long cycle life, but its inclusion increases alloy cost. It is further speculated that the beneficial properties of cobalt in promoting cycle life and reducing pulverization impede low temperature operation, and particularly low temperature power capability. The instant cycle life enhancement elements provide for alloys having long cycle life while reducing the Co concentration and thus offer cost effective alternatives to existing commercial hydrogen storage and metal hydride alloys. In a preferred embodiment, the Co concentration does not exceed 9 at. %. In another preferred embodiment, the Co concentration does not exceed 7 at. %. In still another preferred embodiment, the Co concentration does not exceed 5 at. %. In a further preferred embodiment, the Co concentration does not exceed 3 at. %.

In another preferred embodiment, the instant alloys further include a microstructure-tuning element such as Cu that facilitates low temperature operation. In this embodiment, a microstructire-tuning element promotes an accelerated and directed preferential corrosion of the surface oxide layer that increases the porosity of the surface oxide and promotes the formation of catalytic metallic particles, thereby facilitating the transport and reaction of electrochemically active species to and from catalytic sites supported within the oxide. Inclusion of the instant cycle life enhancement elements in combination with a microstructure-tuning element leads to improved cycle life at low operating temperatures.

In another embodiment herein, the half-cell capacity of the instant alloys is at least 100 mAh/g. In a preferred embodiment, the half-cell capacity is at least 200 mAh/g. In a more preferred embodiment, the half-cell capacity is at least 300 mAh/g.

In another embodiment herein, the magnetic susceptibility is greater than 250 memu/g. In a preferred embodiment, the magnetic susceptibility is greater than 400 memu/g. In a more preferred embodiment, the magnetic susceptibility is greater than 525 memu/g.

The instant alloys thus simultaneously exhibit excellent low temperature power characteristics, excellent cycle life, and reduced Co content while providing excellent hydrogen storage capacity and high catalytic activity.

BRIEF DESCRIPTION OF THE DRAWINGS

FIG. 3. PCT plot of the B, B1, and B12 alloys at 30 C.

FIG. 6. Schematic depiction of PCT plots of alloys exhibiting large (a) and small (b) hysteresis along with an illustration of maximum concentration difference (MCD) as a measure of hysteresis.

FIG. 13. Comparison of the specific power as a function of the state of charge at 35° C. and –30° C. for C-cell batteries that include the B, B1 and instant B23 and B24 alloys as the active negative electrode material.

DETAILED DESCRIPTION OF THE ILLUSTRATED EMBODIMENTS

Figure 1:
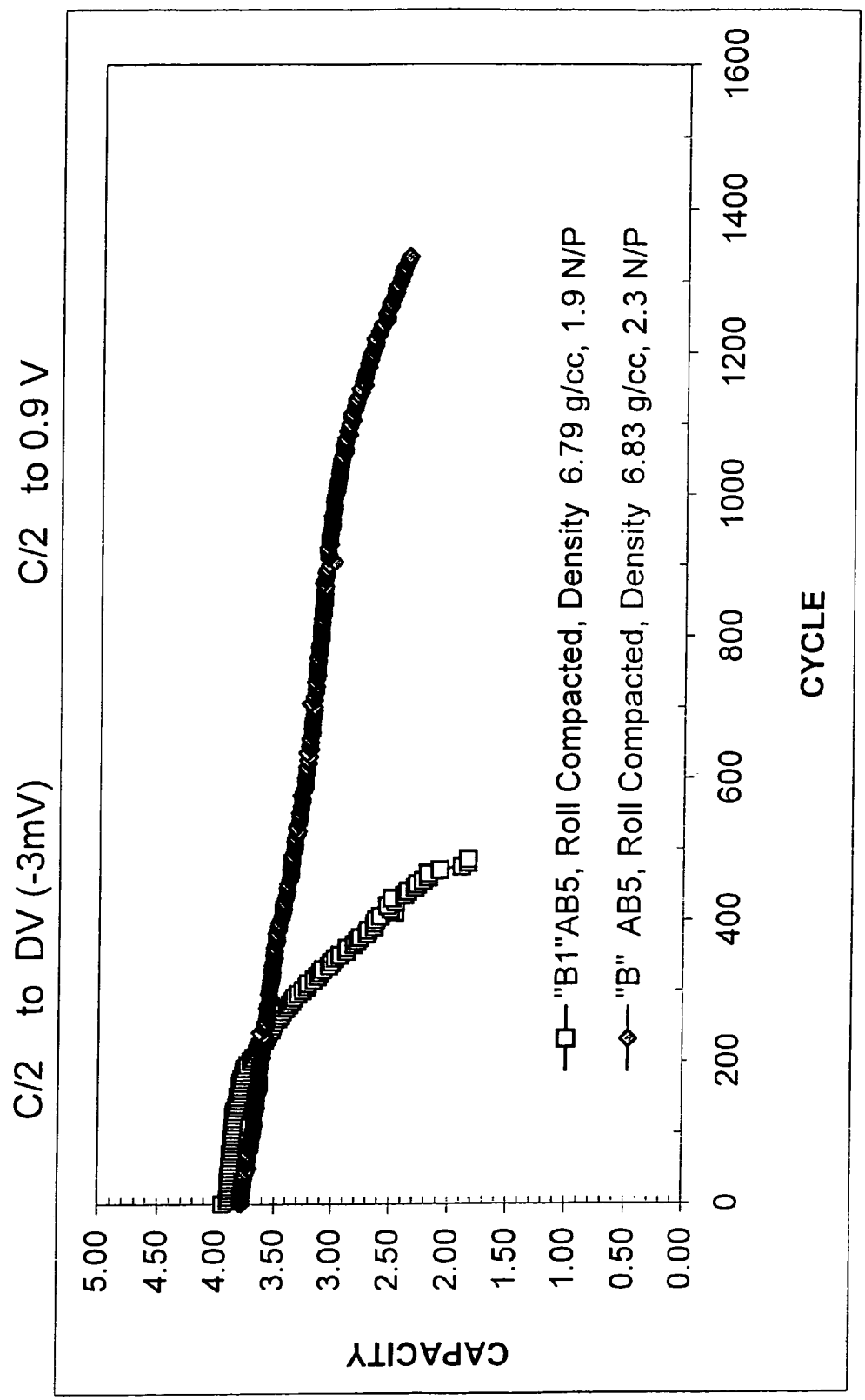
FIG. 1. Comparison of the cycle life characteristics of C-cell batteries that include the B1 alloy of the '008 application (open squares) and a conventional B alloy (diamonds), respectively, as the active negative electrode material.

The instant invention provides hydrogen storage alloys generally suitable for use as electrochemical or thermal hydrogen storage materials that have long cycle life and offer effective performance at low temperature operating conditions. The instant alloys may be used as the active material in electrodes for batteries, electrochemical cells (galvanic or electrolytic) or fuel cells. In a preferred embodiment, the instant hydrogen storage alloys are used as the negative electrode in a nickel metal hydride battery that provides superior performance in low temperature operating environments. The instant invention employs and extends the Ovshinsky principles of atomic engineering, chemical modification, and total interactive environment to achieve improved performance through enhancements of the reaction kinetics of hydrogen storage alloys achieved through modifications of the microstructure of the surface region. Further discussion of the Ovshinsky principles may be found, for example, in U.S. Pat. Nos. 4,431,561 (the '561 patent), 4,623,597 (the '597 patent), 5,840,440 (the '440 patent) and 5,536,591 (the '591 patent) by Ovshinsky and colleagues, the disclosures of which are hereby incorporated by reference herein.

In the '591 patent, Fetcenko, Ovshinsky and colleagues disclosed advances in the catalytic performance of hydrogen storage alloys. The '591 patent considers the compositional microstructure of hydrogen storage alloys in greater detail and recognizes that the composition of hydrogen storage alloys is more complicated than is indicated by the nominal or bulk composition. Specifically, the '591 patent recognizes the importance of a surface oxide layer that is typically present in hydrogen storage alloys and its influence on the charging and discharging processes. In electrochemically driven processes, for example, the oxide layer constitutes an interface between the electrolyte and the bulk hydrogen storage alloy and accordingly may also be referred to as an oxide interface, interface layer or region. Since oxides are typically insulating, they generally inhibit the catalytic performance of electrodes utilizing metals or metal alloys, but also promote life by inhibiting corrosion of the bulk metal alloy. Prior to electrochemical reaction, metal or metal alloy electrodes are typically activated, a process in which the surface oxide layer is removed, reduced or modified to improve performance. The process of activation may be accomplished, for example, by etching, electrical forming, pre-conditioning or other methods suitable for removing or altering excess oxides or hydroxides. See, for example, U.S. Pat. No. 4,717,088 (the '088 patent) to Reichman, Venkatesan, Fetcenko et al; the disclosure of which is hereby incorporated by reference herein.

The '088 patent is directed at one problem that has been encountered in battery cells that use hydride materials as a negative rechargeable hydrogen storage electrode; namely, that freshly made cells may not be able to deliver the expected high capacity even after multiple charge and discharge cycling of the sealed cells. In addition, even in cells that deliver the expected capacity, the pressure that develops during the charging cycle can be high and in some cases, can cause venting of the cell at an early stage.

The invention of the '088 patent allows efficient use of metal hydride electrodes in a sealed cell environment and is generally applicable to any metal hydride electrodes for use in hydrogen storage sealed cells and is especially suitable for sealed, starved electrochemical cells.

The invention of the '088 patent, which, in accordance with one aspect, can be referred to as "negative electrode activation," prepares the negative electrode for use in a sealed cell environment. The techniques of activation alter the physical and chemical properties of the negative electrode in such a way that the hydrogen gas evolution reaction ($H_2O+e^-\rightarrow \frac{1}{2}H_2+OH^-$) is minimized thereby preventing cell pressure from reaching unacceptable levels. In addition, increases in capacity and discharge rate are provided, while a reduction in the charging voltage is also provided. As a result, the hydrogen storage electrode exhibits improved charge acceptance and hydrogen transfer properties.

A method of activating the hydrogen storage electrode in accordance with the '088 patent can also result in the electrode having a concentration of at least 20% on an atomic basis of free metal at the surface of the electrode to a depth of about 100 angstroms from the surface and can also increase the surface area of the electrode, resulting in improved performance. The surface porosity from the surface of the electrode to a depth of at least about 100 angstroms from the surface may be increased from essentially 0% to at least 1% and preferably about 10%, thereby resulting in improved electrode performance.

A method of activation according to the '088 patent includes treating, such as by removing or altering at least a portion of the surface oxides to permit greater charge acceptance and increasing the electrochemical hydrogen transfer prior to installation and sealing of the electrode in a hydrogen storage electrochemical cell. The oxides may be removed or altered chemically, such as by contact with an alkaline solution, or electrochemically.

The formation of surface oxides can occur during metal hydride processing or fabrication. Care must be taken during the pulverization process of metal hydrides to not expose the pulverized material to any conditions which may allow water or oxygen to contact or react with the pulverized alloy. Using other pulverization techniques will produce different distributions of particle sizes, as well as different particle shapes.

The composition, thickness, and oxidation state of the surface oxide is variable. Factors which can influence the degree of oxidation include: the active material composition, the type of process used to prepare powder for electrodes prior to compaction, the particle size and surface area of the initial active material, the method of compacting the powder, and the method used to sinter the compacted powder. Sintering is not a required processing step. The degree of oxidation will generally increase with longer duration of atmospheric exposure. Generally, the higher the temperature during processing, the greater the likelihood of metal oxide formation. The invention of the '088 patent provides methods to overcome the effect of the initial oxidation resulting from material processing or fabrication.

Overcoming the effects of metal oxides formed during electrode fabrication is crucial to the successful operation of metal hydride electrodes in sealed cell applications. The metal oxides are detrimental to sealed cell performance. The degree of surface area increase upon successive charging and discharging cycles is related to the composition of the active material, but excessive levels of metal oxide can hinder surface area increase almost completely. Besides lowering cell pressure by affecting current density, maximized surface area is also important for discharge rate capability and promoting electrode cycle life.

Even through the use of careful fabrication, it is still possible and likely that a surface oxide will be formed upon exposure to air. This is important to recognize because it is not always practical for the electrode to exist under a protective atmosphere. Since as a practical matter some oxidation during electrode fabrication is unavoidable, the invention of the '088 patent provides a method which may be used to overcome the adverse effects of oxide formation by electrode activation. The method includes, prior to placing the negative electrode in a sealed cell, exposing the electrode to an alkaline solution to alter the nature of the oxides. This process, referred to as etching, alters the surface condition of the metal hydride electrode in such a way that excellent charging efficiency is achieved on even the first charge cycle.

It is also possible to reduce the likelihood of hydrogen evolution by increasing electrode surface area, which reduces the current density. This being the case, it is possible to promote initial activation by decreasing initial oxidation or by increasing initial surface area. For materials that form extensive new surface area during electrochemical cycling, but are somewhat difficult to activate, it is advantageous to overcome initial oxidation rather than increase initial surface area. Surfaces created in during electrochemical cycling have the advantage of being virtually oxide free, since there was no exposure to atmosphere during fabrication. This aspect of the in situ created surfaces has a tremendous beneficial impact on discharge rate capability and on cycle life.

It is believed that oxides which are formed during fabrication are relatively thin, but dense and extremely impermeable to hydrogen diffusion. By removing some of the soluble components of the surface oxide, such as vanadium oxides, it is believed that hydrogen diffusion is promoted, allowing improved electrochemical hydrogen transfer and charge acceptance. The surface oxide after etching can be thicker than that of the initial electrode, but by removal of the soluble components is more porous than oxides formed during fabrication.

In addition to promoting charging efficiency, etching assists the discharge reaction: M–H+OH⁻→M+H$_2$O+e⁻. It is believed that the surface which results from etching also promotes the ionic diffusion required for the electrochemical discharge process. It is necessary to react hydrogen from the metal with hydroxyl ions from the electrolyte during discharge. It has been observed that extremely thick oxides, which can occur after extended cycling, and dense oxides, which exist from fabrication, tend to inhibit this process. Acting as a resistance, the oxide can polarize the electrode, reducing the rate at which the discharge process can proceed. It is believed that the etching process of the '088 patent provides an excellent surface for the discharge process. By removal of the soluble oxide components, the overall permeability of the hydrogen and hydroxyl ions is increased. An additional feature of the etch treatment on oxide modification is also believed to beneficially contribute to enhancing the discharge process. By selectively removing only a portion of the oxide layer, etching has provided catalytic sites of nickel metal, which are resistant to oxidation and very insoluble in potassium hydroxide electrolyte. It is believed that in addition to providing catalytic surfaces for the discharge reaction, the nickel being present in the metallic form provides a conductive element to the surface oxide. In effect, the nickel acts to balance the insulating qualities of oxides such as titanium and zirconium oxide.

An additional aspect of the surface condition provided by etching relates to the gradual nature of the oxide-metal interface. Rather than providing a distinct and clear boundary layer between the metal and the electrolyte, the surface after etching is more accurately described as a gradient of oxidation state. Near the electrolyte/oxide interface, the concentration of the soluble components of the oxide is virtually negligible. Thus, the oxide can be characterized as a gradient of composition and oxidation state, having an electrical and catalytic nature suitable for the electrochemical charge and discharge process.

The conditions of etching are temperature and time dependent. Some corrosion of materials such as $V_{0.33}Ti_{0.17}Zr_{0.16}Ni_{0.34}$ occurs naturally, even at room temperature exposure. Cells in which electrodes were soaked for several days in an alkaline media in accordance with the '088 patent have shown very low pressures. Elevated temperatures, such as about 50.degree. C., may be used to accelerate the process.

The actual conditions used in etching according to the '088 patent are related to the material composition and the care with which the electrode was fabricated. The material composition is important because some metal oxide components, such as vanadium oxides, are much more soluble in an alkaline environment than others. Fabrication quality is important because the etch process can be thought of as dissolving or removal of initial oxidation. Obviously, if a greater degree of initial metal oxide exists, a more aggressive etching condition would be needed. Generally, this can mean a higher temperature and/or a longer time of exposure to the alkaline material. However, it should be noted that time and temperature are interdependent. The actual conditions chosen for etching are based on practical considerations and in many cases the etching process can be done at ambient temperature.

The degree of surface area increase which occurs is related to many factors such as the number of cycles, depth of discharge, initial surface condition, and active material composition. The surface area increase comes about due to the expansion and contraction of the metal lattice during the charge and discharge cycles. Further details of activation and etching may be found in the '088 patent.

The '591 patent engineered the oxide layer of hydrogen storage materials and thereby demonstrated improved catalytic activity. Specifically, hydrogen storage alloys having Ni-enriched catalytic regions in the oxide layer were shown to have high catalytic activity. The Ni-enriched catalytic regions may be prepared, for example, through an activation process in which elements of the hydrogen storage alloy other than Ni are preferentially corroded to provide metallic nickel alloy of about 50-70 Å distributed throughout the oxide layer. The Ni-enriched catalytic regions function as catalytic sites having high activity. Formation of the Ni-enriched catalytic regions of the '591 patent is influenced by many factors including the precise alloy formula, its processing with respect to the nickel concentration within the intial oxide, the activation method such as etching temperature and concentration, and processing steps such as melt-cast and grain growth such as observations that the nickel regions within the oxide interface are promoted by a pre-activation thermal annealing step. The annealing step acts to condition the surface region of a hydrogen storage alloy and renders it more susceptible to the formation of Ni-enriched catalytic regions during activation.

As discussed in the '088 patent, it is known that the steady state surface composition of V—Ti—Zr—Ni alloys can be characterized as having a relatively high concentration of metallic nickel. An aspect of the '591 patent is a significant increase in the frequency of occurrence of these nickel regions as well as a more pronounced localization of these regions. More specifically, the materials of the '591 patent have enriched nickel regions of 50-70 Å in diameter dispersed or distributed throughout the oxide interface and varying in proximity from 2-300 Å, preferably 50-100 Å, from region to region. As a result of the increase in the frequency of occurrence of these nickel regions, the materials of the '591 patent exhibit increased catalysis and conductivity.

The enriched Ni regions of the '591 patent can be formed via the following fabrication strategy: Specifically formulate an alloy having a surface region that is preferentially corroded during activation to produce the enriched Ni regions. Without wishing to be bound by theory, it is believed, for example that Ni is in association with an element such as Al at specific surface regions and that this element corrodes preferentially during activation, leaving the enriched Ni regions of the '591 patent. "Activation" as used herein and in the '591 patent refers to "etching" or other methods of removing excessive oxides, such as described in the '088 patent, as applied to electrode alloy powder, the finished electrode, or at any point in between in order to improve the hydrogen transfer rate, charging rate and/or discharging rate.

The Ni-enriched catalytic regions of the '591 patent are discrete regions. The catalytic activity of the Ni-enriched catalytic regions is controllable by controlling the size, dispersion, separation, chemical composition and local topology. In one embodiment of the '591 patent, the discrete Ni-enriched catalytic regions include metallic Ni particles having an average diameter of 50-70 Å or less that are separated from each other by distances of 2-300 Å. As shown in FIG. 1 of the '591 patent, the term 50-70 Å does not mean that the catalytic regions are all within this size range, but as seen from the figure that many of the catalyst particles are larger and smaller. The Ni-enriched catalytic regions are dispersed or distributed throughout the oxide layer. The portions of the oxide layer surrounding the Ni-enriched catalytic regions or catalytic metallic Ni particles shall hereinafter be referred to as the support matrix, supporting matrix, supporting oxide, oxide support or the like. The Ni-enriched catalytic regions are thus supported by or within the support matrix. The support matrix may include fine and coarse grained oxides and/or hydroxides of one or more of the metallic elements present in the hydrogen storage alloy composition and may also include multiple phases, some of which may be microcrystalline, nanocrystalline or amorphous.

The supporting matrix and catalytic sites thereof are further discussed in U.S. Pat. No. 6,270,719 (the '719 patent) to Fetcenko, Ovshinsky and colleagues. The '719 patent teaches additional modification of Ni-enriched regions to provide further improvements in catalytic activity. The '719 patent teaches formation of catalytically active metal-enriched regions comprising not only metallic Ni particles, but also particles of metal alloys such as alloys of Ni with one or more of Co, Cr, V, Pt, Pd, Au, Ag, Rh, Ti, Mn, or Al as well as other metal alloys (e.g. PtAu). The '719 patent further teaches that alloying may provide particles having an FCC structure instead of the BCC structure of the metallic Ni or Ni alloy particles of the '591 patent.

In the '008 application, Fetcenko, Ovshinsky and colleagues consider strategies for achieving hydrogen storage alloys having improved low temperature operating characteristics. The '008 application further considers the nature of the oxide support layer of hydrogen storage alloys and is particularly concerned with "access to the catalyst regions" and the microstructure of the support matrix. The performance of hydrogen storage materials is based on factors that include the intrinsic activity of catalytic sites, the number of catalytic sites, interactions between catalytic sites, interactions between catalytic sites and hydrogen storage sites, the number of hydrogen storage sites and the stability of hydrogen storage sites. These factors influence the hydrogen storage capacity, thermodynamic properties, and kinetics of hydrogen storage materials. The '561, '597, '440, '591 and '719 patents described hereinabove have demonstrated various ways to improve the activity of catalytic sites, the number of catalytic sites, the number of hydrogen storage sites, and the stability of hydrogen storage sites.

The '008 application is directed at additional features of the support matrix and/or catalytic metallic regions or particles that are beneficial to the performance of hydrogen storage materials. More specifically, the '008 application is concerned with beneficial modifications of the region at or near the surface of a hydrogen storage alloy. The region at or near the surface of a hydrogen storage alloy may also be referred to herein as the surface or interface region, surface or interface layer, surface or interface oxide, oxide interface or the like. The surface or interface region constitutes a three-dimensional interfacial region between the electrolyte and the bulk portion of an electrochemical hydrogen storage alloy. In one embodiment of the '008 application, the interface region includes catalytic metal or metal alloy particles having angstrom scale dimensions that are supported by a surrounding support matrix having an engineered pore structure, pore size distribution and a higher degree of porosity than with previously known metal hydride alloys. The catalytic metallic particles are dispersed or distributed throughout the oxide interface region. As described in the '008 application, the relative proportions of catalytic metal or metal alloy particles and support matrix in the surface region vary with the composition and processing treatments of the instant hydrogen storage alloys. In a preferred embodiment, the interface region of the instant alloys is a three-dimensional region having sufficient oxide content to provide an oxygen concentration of at least 10%.

One aspect of the '008 application focuses on tuning the microstructure of the support matrix in the interface region of hydrogen storage alloys so as to create a more open network structure that facilitates the access of reactant species to catalytic sites and the departure of product species away from catalytic sites through voids or channels in the interface region. Voids and channels of sufficient size relative to participating reactant species (in charging or discharging processes) facilitate the mobility of reactant species. As described in the '008 application, the voids are distributed throughout the interface and have a volume fraction of greater than 5%. In a more preferred embodiment, the voids have a volume fraction of greater than 15%. In a still more preferred embodiment, the voids have a volume fraction of greater than 20%. The presence of voids or channels in the interface region of the instant alloys leads to greater utilization of catalytic sites and improved performance, particularly at low temperature. As described in the '008 application, the voids may be channels having a cross-sectional dimension of 10-20 Å and/or a longitudinal dimension of greater than about 20 Å. In a preferred embodiment, porosity of the support matrix is increased through formation of open channels or voids having a cross sectional dimension of 1-2 nm that extend in three dimensions throughout the surface layer. The channels or voids provide pathways to and from catalytic metallic particles that facilitate access of reactant species to and departure of product species from the catalytic metallic particles. The kinetics of charging/discharging processes and hydriding/dehydriding processes are thereby enhanced. The voids may also be tubular, spherical or plate-like in shape or structure. As shown in TEM examination of such a preferred oxide, there is the appearance of "channels" leading to and from the catalyst regions dispersed throughout the oxide interface, and the inventors believe these channels are particularly useful in promoting reactant transfer species and low temperature operation such as −30° C.

Another aspect of the '008 application focuses on tuning the microstructure of the interface region of hydrogen storage alloys so as to increase the density of catalytic sites. A greater number of catalytic sites in a given volume of hydrogen storage alloy leads to an increase in overall catalytic reactivity. In one embodiment, the volume fraction of catalytic metallic sites in the interface region is greater than 30%. In another embodiment, the volume fraction of catalytic metallic sites is greater than 40%. In still another embodiment, the volume fraction of catalytic metallic sites is greater than 50%. The catalytic metallic particles may be nickel, nickel alloy or other metal alloy particles having an average diameter of less than about 100 Å. In another embodiment, the catalytic metallic particles have an average diameter of less than 50 Å. In still another embodiment, the catalytic metallic particles have an average diameter of less than 30 Å.

The beneficial microstructure tuning effects present in the hydrogen storage alloys of the '008 application may be achieved through inclusion of a microstructure tuning element in the alloy composition, through control of one or more alloy processing parameters (e.g. heat treatment temperature, processing ambient, time of contact with air etc.), through inclusion of one or more etching steps during processing or after alloy formation or a combination of the above. In a preferred embodiment of the '008 application, microstructure tuning provides a hydrogen storage alloy having a high density of catalytic sites surrounded by a support matrix having a high degree of engineered pore size distribution and porosity so that the mobility of reactant and product species in the vicinity of catalytic sites is substantially unimpeded and that access of the reactants and reaction products to the catalysts is promoted.

In the absence of microstructure tuning according to the invention of the '008 application, the base hydrogen storage alloys may have metal enriched catalytic regions that include catalytically active particles comprised of nickel, nickel alloy as well as other metals or metal alloys as described in the '591 and '719 patents. As described in the '008 application, microstructure tuning permits control of the porosity of the support matrix surrounding the catalytically active particles and thereby enhances the mobility of relevant molecules or molecular species in electrochemical or thermal charging or discharging processes with respect to the support matrix. The microstructure of the alloys of the '008 application have high porosity surface regions that include voids or channels that facilitate access of reactant species within the surface region as well as to and from catalytic particles or regions. Microstructure tuning may also provide a higher density of catalytic metallic particles in the interface region of hydrogen storage materials. Microstructure tuning leads to better charging and/or discharging kinetics, especially at low temperatures, as shown in several examples presented in the '008 application.

In one embodiment of the '008 application, a base alloy is modified with one or more microstructure tuning elements that act to favorably tailor the properties of the supporting matrix to provide a higher concentration of catalytic metallic particles as well as greater accessibility of reactive species to the catalytic metallic particles. The microstructure tuning elements facilitate an accelerated and directed preferential corrosion of the support matrix during activation or operation to provide a more porous and accessible support matrix that also includes locally enriched concentrations of catalytic metallic particles distributed throughout the surface region of the instant hydrogen storage alloys. As the support matrix becomes more porous and less oxidic, the catalytic metallic particles may become at least partially self supporting. The modifications of the support matrix provided by the instant microstructure tuning elements increase the number of catalytic sites and facilitate access of reactants to catalytic sites as well as departure or transport of reaction products from catalytic sites thereby providing faster kinetics for hydriding/dehydriding and charging/discharging processes of thermal and electrochemical hydrogen storage alloys.

As described in the '008 application, formation of a high porosity support matrix may be achieved through a preferential corrosion of the surface layer. The surface layer is typically a multicomponent oxidic phase that includes oxides or hydroxides of one or more of the metals present in the formula of a hydrogen storage alloy. Oxides or hydroxides based on different metals exhibit different degrees of corrosion in an electrochemical cell during alloy processing, activation and/or operation. While not wishing to be bound by theory, the inventors of the '008 application proposed that microstructure tuning facilitates an accelerated and directed preferential corrosion of the surface oxide layer. In one embodiment of the '008 application, microstructure tuning is provided through the inclusion of formula modifiers, which may be referred to as microstructure tuning element, in the alloy composition. According to the accelerated and directed preferential corrosion effect in this embodiment, corrosion effects ordinarily encountered during activation and/or operation of an electrochemical cell may become exaggerated in the presence of a microstructure tuning element and as a result, a more porous support matrix is formed. Preferred microstructure tuning modifiers according to the '008 application include Cu, Fe, Sn and Zn.

In addition to porosity modifications, accelerated and directed preferential corrosion according to the '008 application may also lead to a relative local enhancement, at or in the vicinity of the surface, of the concentration of one or more elements that are less susceptible to corrosion. As in the '591 and '719 patents, local enhancements in the concentrations of one or more metals may facilitate the formation of metal enriched regions that include catalytic metallic particles. Microstructure tuning in accordance with the '008 application, with its ability to effect exaggerated corrosion, may thus provide for a substantially increased density of catalytic metallic particles in hydrogen storage alloys relative to the alloys described in the '591 or '719 patents.

The instant invention further considers alloy formulations and processing directed at improving the cycle life characteristics of metal hydride electrode and hydrogen storage materials. Of particular concern to the instant inventors is the cycle life of metal hydride alloys that exhibit high power and/or high discharge rates at low temperature conditions. More specifically, the instant inventors consider whether the cycle life of hydrogen storage alloys is influenced by the microstructure effects described in the '008 application that proved to be beneficial to the low temperature power and discharge rates of nickel metal hydride electrodes. As described more fully hereinbelow, the instant inventors find that the cycle life of the microstructurally modified alloys of the '008 application may be reduced compared to corresponding alloys whose microstructures have not been modified in accordance with the invention of the '008 application. In other words, the instant inventors have found that in some instances, efforts expended at improving the low temperature power and discharge characteristics of metal hydride electrodes may deleteriously impact the cycle life characteristics of the electrodes. The potentially reduced cycle life is dependant on many factors of a particular cell design such as depth of discharge, N/P ratio, electrolyte level and other factors know to those skilled in the art. However, for general purposes, the present inventors observed that in some cases cycle life was nominally the same as the control alloys and in other cases cycle life could be reduced by 20-50% or more. Accordingly, the instant inventors address the cycle life properties of hydrogen storage alloys suitable for use at low temperature operating conditions and provide a solution to the problem of achieving higher cycles life. Of particular interest, is the development of metal hydride materials exhibiting long cycle life and excellent low temperature performance in alloys having a low concentration of costly Co. Also of particular interest, are metal hydride materials that exhibit long cycle life while maintaining the beneficial microstructural features (including high porosity achieved through preferential corrosion, high volume fraction of voids, high volume fraction of catalytic metallic particles, improved accessibility to catalytic sites via increased porosity, and other features that enable better kinetics of charging and discharging) described hereinabove in connection with the '008 application.

Metal hydride materials in accordance with the instant invention include modified forms of base hydrogen storage alloys comprising one or more transition metals or rare earths as well as base alloys in combination with a microstructure tuning element as described in the '008 application. The preferred base alloys have the formula type $AB_5$ where components A and B may be transition metals, rare earths, post-transition metals or combinations thereof in which component A generally has a stronger tendency to form hydrides than component B.

Base $AB_5$ compositions include those in which A is Y or a lanthamide element or a mixture or alloy thereof and B is a transition metal element or a mixture or alloy thereof. $LaNi_5$ is the prototypical base ABs compound and has been modified in various ways to improve its properties. Ni may be partially replaced by elements including Mn, Co, Al, Cr, Ag, Pd, Rh, Sb, V, or Pt, including combinations thereof. La may be partially replaced by elements including Ce, Pr, Nd, or other rare earths including combinations thereof. Mischmetal may also wholly or partially replace La. Representative base $AB_5$ compositions within the scope of the instant invention have been discussed in the '667 and '591 patents and in the '008 application.

The base alloys of the instant invention may also comprise non-stoichiometric compositions. Non-stoichiometric compositions are compositions in which the ratio of elements may not be expressible in terms of simple ratios of small whole numbers. Representative non-stoichiometric compositions include $AB_{5 \pm x}$, where x is a measure of the non-stoichiometric compositional deviation. The base alloys of the instant invention may also comprise multiphase materials where a multiphase material is a combination or mixture of materials having different stoichiometries, microstructures and/or structural phases. Structural phases include crystalline phases, microcrystalline phases, nanocrystalline phases and amorphous phases.

The instant alloys may generally be referred to herein as $AB_5$ or $AB_5$-type alloys and this terminology shall refer to stoichiometric and non-stoichiometric variants as described hereinabove. $AB_5$-type compounds are characterized by a $CaCu_5$ crystal structure (hexagonal, P6/mmm space group) and have a stable range of stoichiometric and non-stoichiometric compositions extending from about $AB_{4.85}$ to about $AB_{5.4}$. (See, for example, the article entitled "Intermetallic compounds as negative electrodes of Ni/MH batteries" by F. Cuevas et al. in Applied Physics A, vol. 72, p. 225-238 (2001).)

In a preferred embodiment, the instant hydrogen storage alloys comprise an $AB_5$ base alloy that has been modified with a cycle life enhancement element to achieve improved cycle life. In a most preferred embodiment, the instant hydrogen storage alloys comprise an $AB_5$ base alloy that has been modified by a microstructure tuning element according to the '008 application and further modified in accordance with the instant invention with a cycle life enhancement element. As indicated hereinabove, the preferred microstructure tuning elements according to the '008 application are Cu, Fe, Sn, Zn or combinations thereof where the microstructure tuning element preferably enters the B site of an $AB_5$ structure. The most preferred cycle life enhancement elements according to the instant invention, in combination with reduced cobalt concentration, and addition of copper, are Zr and Si. Other cycle life enhancement elements according to the instant invention include Sc, Mg, Ca, Ti, V and Cr. In this embodiment, the instant alloys include alloys having a bulk region and an interface region where the interface region includes catalytic metallic particles supported by a support matrix and voids and channels as described in the '008 application. In a preferred embodiment, the catalytic metallic particles have diameters of less than about 100 Å and are distributed along with voids or channels throughout the interface region where the volume fraction of void or channels is greater than 5%. In another embodiment herein, the void or channel volume fraction is greater than 10%. In still another embodiment herein, the void or channel volume fraction is greater than 15%. In yet another embodiment herein, the void or channel volume fraction is greater than 20%.

In another embodiment, the instant alloys include alloys having a bulk region and an interface region where the interface region includes catalytic metallic particles supported by a support matrix as described in the '591 and '667 patents where the alloy has been further modified in through the inclusion of a cycle life enhancement element according to the instant invention. In this embodiment, the catalytic metallic particles preferably have diameters of less than about 100 Å. In another preferred embodiment, the catalytic metallic particles are 50-70 Å in diameter and separated by 2-300 Å or more preferably 50-100 Å. In a preferred embodiment, the volume fraction of catalytic metallic particles is greater than 30% and in a more preferred embodiment, the volume fraction of catalytic metallic particles is greater than 50%.

The instant alloys may be used as thermal or electrochemical hydrogen storage materials in devices such as fuel cells or batteries. Battery types include flat cells, wound cells, cylindrical cells, prismatic cells, sealed cells, vented cells etc. Batteries formed from the instant hydrogen storage materials provide higher powers than currently available batteries at room temperature and especially at temperatures below room temperature such as 0° C. or −30° C. Not only continuous discharge at cold temperatures, but the inventors have also noted the significant improvement in high power pulsed discharge capability crucial for vehicle acceleration and acceptance of ultra high power regenerative braking energy. Batteries formed from the instant hydrogen storage materials are rechargeable and may be used in HEV or EV applications and as starter batteries in conventional vehicles such as automobiles, buses, tractors, etc.

Further insight into the scope of the instant invention are provided in the illustrative examples presented hereinbelow. The following examples are intended to be representative of, rather than comprehensively defining of, the instant invention. The EXAMPLES consider the cycle life characteristics of selected alloys having a microstructure tuned according to the '008 application and compare them to those of a representative conventional alloy. The selected alloys modified as described in the '008 application are sometimes observed to have degraded cycle life characteristics relative to typical conventional alloys. The EXAMPLES further consider underlying reasons for impaired cycle life, develop metrics for discerning when cycle life is likely to be impaired and demonstrate modified metal hydride compositions that possess improved cycle life characteristics while maintaining favorable low temperature power and discharge characteristics.

Several conventional and microstructurally tuned (as described in the '008 application) hydrogen storage alloys are referred to in the EXAMPLES presented hereinbelow. The compositions of the B, B0, B1, B4 and B12 alloys described in the '008 application are given in the following Table 1:

TABLE 1

| Alloy | La | Ce | Pr | Nd | Ni | Co | Mn | Al | Cu |
|---|---|---|---|---|---|---|---|---|---|
| B | 10.5 | 4.3 | 0.5 | 1.4 | 60.0 | 12.7 | 5.9 | 4.7 | 0 |
| B0 | 10.5 | 4.3 | 0.5 | 1.4 | 64.5 | 8.4 | 4.6 | 6.0 | 0 |
| B1 | 10.5 | 4.3 | 0.5 | 1.4 | 64.5 | 5.0 | 4.6 | 6.0 | 3.4 |
| B4 | 10.5 | 4.3 | 0.5 | 1.4 | 65.9 | 5.0 | 4.6 | 6.0 | 2.0 |
| B12 | 10.5 | 4.3 | 0.5 | 1.4 | 64.5 | 3.0 | 4.6 | 6.0 | 5.4 |

The preparation of the alloys presented in Table 1 is described in the '008 application and is similar to the preparation of new alloys according to the instant invention that is described in EXAMPLE 4 hereinbelow. The alloys B1, B4, and B12 are alloys having a micro structure modified according to the '008 application. Specifically, the B1, B4 and B12 alloys include the microstructure tuning element Cu and have improved low temperature power and discharge characteristics relative to the B and B0 alloys, as described in the '008 application. The alloys B and B0 are conventional alloys that are not modified according to either the invention of the '008 application or the instant invention. The B alloy is a typical commercial alloy composition and the B0 alloy is similar to commercial alloys.

EXAMPLE 1

The instant inventors compared the cycle life characteristics of batteries utilizing the B and B1 alloys. A standard commercial C-cell battery design was used in the comparison. The battery design included a negative electrode containing a hydrogen storage alloy, a nickel hydroxide positive electrode (OBC AP 52 HiZn), a fluorinated polypropylene/polyethylene separator (Freudenberg FS2226) and a 30% KOH electrolyte. Two batteries were used in the cycle life comparison. Each battery included a different hydrogen storage alloy as the active material in the negative electrode; the batteries were otherwise identical in construction. A roll compacted negative electrode design was used. One of the batteries used the B1 alloy as the active negative electrode material and the other battery used the B alloy. The cycle life of each of the batteries was tested to examine the stability of the battery capacity upon repeated cycles of charging and discharging. Charging of each battery was completed at a C/2 rate with negative $\Delta V$ as the method of charge termination. Under this method, charging was terminated when a 3 mV decrease in voltage was detected. Discharging of each battery was completed at a C/2 rate until the battery voltage decreased to 0.9 V. Each cycle included one charging step and one discharging step and was repeated until the battery capacity drops to less than 70% of its initial capacity.

The results of the cycle life tests are shown in FIG. 1 herein, where the battery capacity (measured in A-h) is plotted as a function of cycle number for measurements completed at room temperature. The testing shows that the battery based on the B1 alloy exhibited a fairly stable capacity out to about 200 or so cycles and then progressively decreased in a more pronounced fashion. The battery based on the conventional B alloy, on the contrary, showed a more stable capacity over a greater number of cycles and showed a more gradual reduction in capacity upon cycling.

The results of FIG. 1 indicate that the battery based on the B1 alloy shows a diminished cycle life in comparison to an analogous battery based on the B alloy. As discussed in the '008 application, the B1 alloy contains Cu as a microstructure tuning element and its inclusion leads to superior power and discharge characteristics at low temperatures (e.g. 0° C. and –30° C.) relative to conventional alloys. The results of FIG. 1 herein, however, indicate that the cycle life characteristics of the B1 alloy in the C-cell are compromised. The instant inventors have completed similar cycle life tests on the B12 alloy and have also encountered diminished cycle life relative to conventional B and B0 alloys. The magnitude of the reduction in cycle life has been found to be highly dependent on the battery type, battery design and actual test conditions. In some cases, relatively little or no reduction in cycle life was observed and in other cases, a substantial reduction in cycle life was observed. On average, there seems to be a trade-off in the low temperature operating characteristics and cycle life of the alloys of the '008 application such that, at least in some instances, efforts expended at improving the low temperature power and discharge characteristics through microstructure tuning according to the '008 application may deleteriously impact the cycle life characteristics of metal hydride electrodes. The instant inventors thus believe it is desirable to develop alloys having low temperature characteristics comparable to those described for the B1 and B12 alloys in the '008 application, while maintaining cycle life characteristics that are comparable to those of the B, B0 and similar commercial alloys. The instant inventors describe in EXAMPLE 4 herein alloy compositions directed at the solution of this problem.

EXAMPLE 2

In this example, factors that may be responsible for the reduced cycle life of the B1 alloy discussed in the experiments of EXAMPLE 1 are discussed. Elucidation of possible underlying causes is an important step in developing strategies for improving cycle life. In an effort to understand cycle life degradation, the instant inventors have probed the physical states of the B and B1 alloys at various points during a series of charge-discharge cycles. The physical state was probed by scanning electron microscopy and representative micrographs resulting from these studies are presented in FIGS. 2A and 2B. The micrographs depict the granularity of the B and B1 alloys upon repeated cycling to probe the effect of cycling on the particle size of the metal hydride electrode material. The micrograph images were obtained using a 20 kV electron beam probe and are shown at a magnification factor of 600×.

Figure 2A:
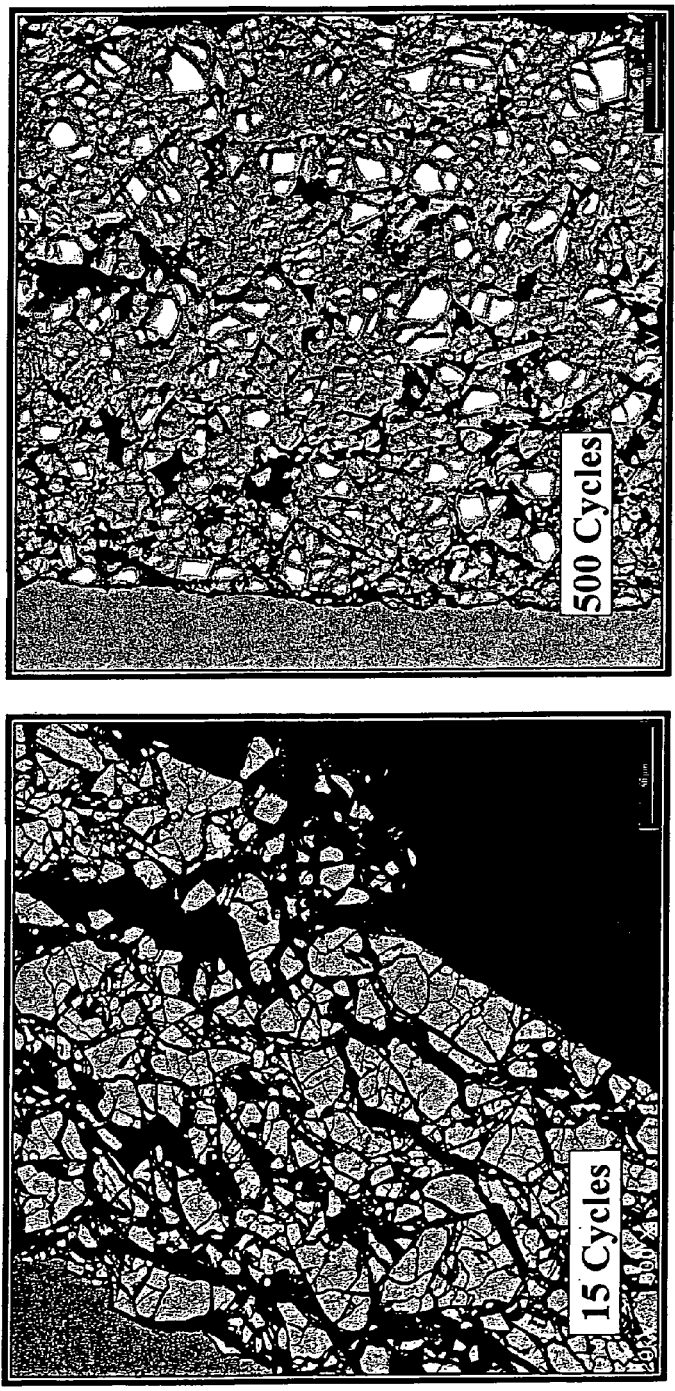
FIG. 2A. Transmission electron micrograph showing the microstructure of the B alloy after 15 and 500 cycles.

FIG. 2A shows the effect of cycling on the granularity of the B alloy as a function of cycling. Images obtained after 15 and 500 cycles are shown. The alloy is comprised of a plurality of grains or particles. An initial particle size distribution is obtained upon activation of the material. This example considers the evolution of the average particle size and particle size distribution upon repeated cycling. The images shown in FIG. 2A reveal a reduction in the average particle size of the B alloy upon cycling. The particles after 15 cycles are on average much larger than the particles after 500 cycles. Repeated charge-discharge cycling is thus seen to degrade or pulverize the particles of the hydrogen storage alloy and this effect is believed to be deleterious to the cycle life. Possible effects of pulverization include increased cell resistance, greater tendency for oxidation of the particle surfaces, deterioration of the cell balance, and increased electrolyte consumption. Pulverization is believed to be responsible for the gradual decrease in capacity upon cycling shown in FIG. 1 for the B alloy.

Figure 2B:
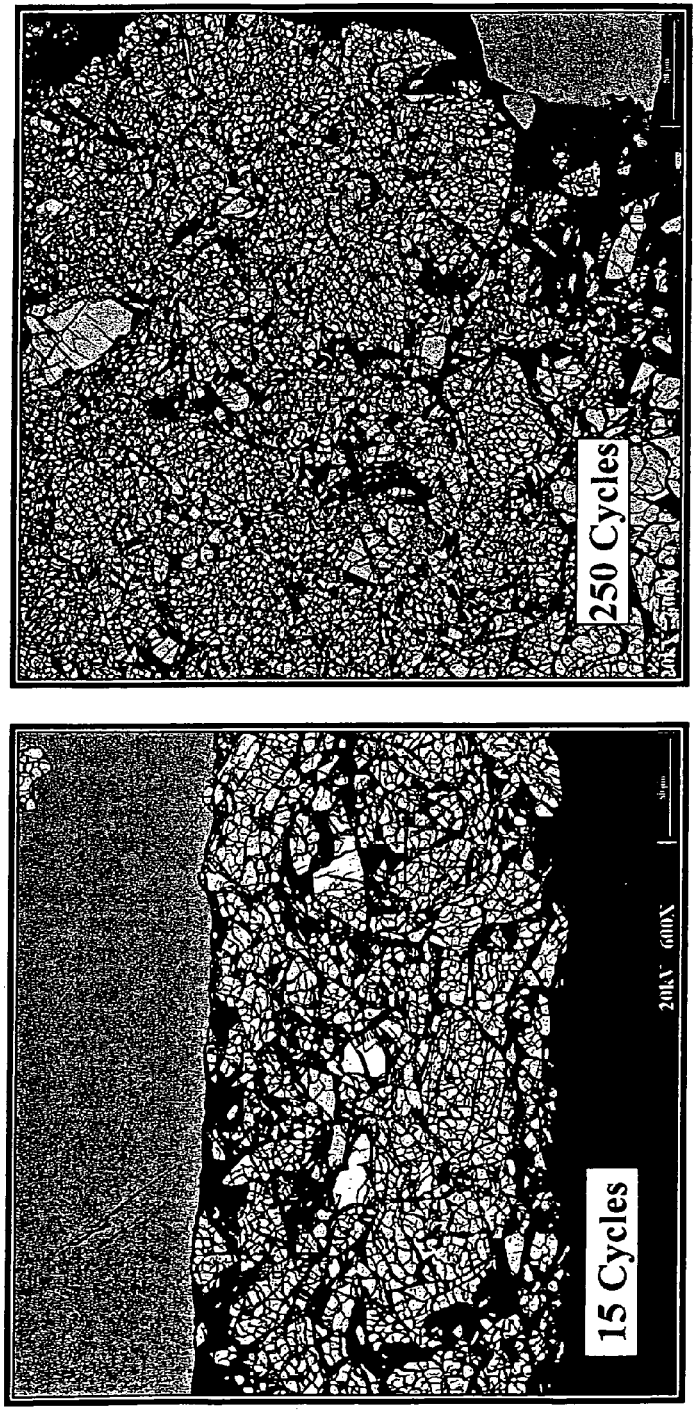
FIG. 2B. Transmission electron micrograph showing the microstructure of the instant B1 alloy after 15 and 250 cycles.

FIG. 2B shows micrograph images of the B1 alloy after 15 and 250 cycles. A comparison of the granularity of the B alloy (FIG. 2A) and the B1 alloy (FIG. 2B) after 15 cycles reveals that the average particle size of the B1 alloy is substantially smaller and that this trend continues to higher cycle numbers. At 250 cycles, the B1 alloy is pulverized to a far greater degree than the B alloy is after 500 cycles. The micrographs of FIGS. 2A and 2B show that the B1 alloy is more susceptible to pulverization than the B alloy. The instant inventors believe that the greater tendency of the B1 alloy to pulverize upon cycling is responsible for the diminished cycle life characteristics of the B1 alloy relative to the B alloy.

In addition to achieving excellent low temperature performance, one of the goals in designing the B1 and other alloys of the '008 application is a reduction in the alloy cost. This was achieved by decreasing the concentration of Co, an expensive component of current commercial grade metal hydrides. Co has been included in commercial metal hydrides, despite its cost, because it has been shown to improve cycle life. The results of this example are consistent with a beneficial role for Co and suggest that removing Co in the low temperature alloys of the '008 application has a deleterious effect on cycle life. One goal of the instant invention is to improve the cycle life of the low temperature alloys of the '008 application while maintaining a concentration of Co that is as low as possible.

EXAMPLE 3

The results presented in EXAMPLE 2 indicate that reducing the degree of pulverization upon cycling may improve the cycle life characteristics of metal hydride electrode materials. In this view, repeated absorption and desorption cycles work to breakdown the particles of the metal hydride material, thereby impairing efficacy. In order to optimize the search for new alloys that provide long cycle life, it is preferable to develop reliable and accurate criteria for determining the likelihood that a new composition will provide stable capacity over a large number of charge-discharge cycles. The ultimate test is a direct measurement of the cycle life. This test, unfortunately, is time consuming as it requires construction of electrodes, assemblage of a battery and repeated measurement of capacity over a large number of time-consuming cycles. In the cycle life test shown in FIG. 1, for example, it takes about one day to complete 5 cycles. Thus, 200 days are needed to complete 1000 cycles. It would be more convenient to screen alloys without initially undertaking direct cycle life experiments through another, more efficient method of assessing the likelihood of achieving long cycle life. Preferably, the method can be applied to the alloy itself without having to form electrodes and assemble batteries. Such a method is described in this example.

In this example, PCT (pressure-composition-temperature) measurements of the B, B1 and B12 hydrogen storage alloys are described. The PCT curve of an alloy is a measurement of the equilibrium hydrogen pressure of a hydrogen storage alloy as a function of hydrogen loading at a particular temperature. A typical PCT curve shows a strongly upwardly sloping solid solution phase region ($\alpha$-phase) at low hydrogen loading, followed by a generally flat or weakly or gradually sloping equilibrium plateau region ($\alpha$-phase$\leftrightarrows\beta$-phase) at intermediate hydrogen loading, and another strongly upwardly sloping hydride phase region ($\beta$-phase) at high hydrogen loading. PCT curves can be measured on absorption of hydrogen (hydrogen uptake, from low loading to high loading) or on desorption of hydrogen (hydrogen release, from high loading to low loading). The PCT curves on absorption and desorption may be referred to as absorption and desorption isotherms, respectively. Typically, the absorption and desorption isotherms do not coincide, instead a hysteresis effect is present where the plateau pressure on absorption is higher than the plateau pressure on desorption.

A further characteristic of the PCT curve of interest in practical applications is the maximum reversible hydrogen storage capacity. The maximum reversible hydrogen storage capacity corresponds to the increase in the concentration of absorbed hydrogen that occurs over the plateau region. The low concentration endpoint of the plateau region is marked by saturation of the $\alpha$-phase of the alloy and initial formation of the $\beta$-phase. As the absorbed hydrogen concentration increases in the plateau region, the $\alpha$-phase is progressively converted to the $\beta$-phase. The high concentration endpoint of the plateau region corresponds to the lowest concentration of absorbed hydrogen at which the $\alpha$-phase is no longer present. The difference in the concentration of absorbed hydrogen between the two endpoints of the plateau region corresponds to the maximum reversible hydrogen storage concentration. In practical applications, it is normally desirable to have hydrogen storage alloys that provide a high maximum reversible hydrogen storage concentration.

FIG. 3 shows PCT curves for the B, B1 and B12 alloys. Absorption and desorption isotherms for each alloy are presented, as indicated by the symbols, for experiments completed at 30° C. The central region of the diagram is enlarged in the inset shown at lower right in the diagram. Hysteresis is present whenever the absorption and desorption isotherms do not coincide and the degree to which the isotherms fail to coincide is a measure of the extent of the hysteresis. In FIG. 3, all three alloys are observed to exhibit hysteresis. The extent of the hysteresis, however, is much greater for the B1 and B12 alloys than for the B alloy.

The instant inventors believe that hysteresis effects are detrimental to the long term cycling stability of metal hydride materials and that materials that exhibit large hysteresis effects are more susceptible to premature failing on repeated cycling. The reasoning underlying the instant inventors belief that hysteresis is detrimental can be described with reference to FIG. 4, which shows schematic examples of PCT curves exhibiting small and large hysteresis. Beneath each PCT curve is a depiction of the distribution of hydrogen in the metal hydride material, where surface and absorbed hydrogen are shown as dark circles. The depiction of the absorbed hydrogen distribution shown in FIG. 4 for small and large hysteresis materials is used as the basis for the following discussion.

In small hysteresis materials, the absorption and desorption isotherms are close to coinciding. Low hysteresis materials are characterized by an internal distribution of absorbed hydrogen that is nearly uniform throughout the material. The absorbed hydrogen concentration near the surface is close to the absorbed hydrogen concentration in the bulk (interior) of the material. In a large hysteresis material, in contrast, the concentration of absorbed hydrogen is less uniform, with the hydrogen concentration in the vicinity of the surface being greater than the hydrogen concentration in the bulk. In terms of concentration gradients, a large hysteresis material exhibits a large gradient in the concentration of absorbed hydrogen, while a small hysteresis material exhibits a small gradient in the concentration of absorbed hydrogen.

The large concentration gradient associated with a large hysteresis material is a manifestation of the greater difficulty associated with absorbing hydrogen into the material. Hydrogen absorption and desorption are governed by both thermodynamic and kinetic processes. Thermodynamics controls the equilibrium hydrogen concentration that can be stored in a metal hydride and determines the plateau pressure of a hydrogen storage alloy. Phenomenologically, thermodynamics is concerned with the free energy difference between the absorbed and unabsorbed states of the hydrogen storage material. Kinetics, on the other hand, is concerned with the activation barriers associated with the absorption (or desorption) of hydrogen. In order for hydrogen to become absorbed, hydrogen gas or an electrochemical hydrogen bearing species such as water must adsorb on the surface and dissociate into hydrogen atoms or ions that diffuse or migrate into the metal hydride material to occupy hydrogen storage sites. The diffusion or migration process involves motion of hydrogen within open regions (e.g. hopping among interstitial sites) of the metal hydride structure. Such motion is inhibited by the placement of lattice atoms of the metal hydride and is necessarily accompanied by an energy barrier. The initial penetration of hydrogen from the surface into the near-surface portion of the interior of the metal hydride also has an energy barrier associated with it.

Large energy barriers inhibit the motion of hydrogen and act to reduce the uniformity of the absorbed hydrogen concentration within the metal hydride material. As more hydrogen is accumulated in the near surface region, the concentration gradient between the near surface region and the interior of the metal hydride increases, thereby providing a greater diffusive driving force for the motion of hydrogen toward the interior of the metal hydride. The establishment of a large concentration gradient thus facilitates an overcoming of the kinetic barriers to hydrogen motion. Large hysteresis materials possess greater activation barriers to hydrogen motion than small hysteresis materials and thus exhibit larger concentration gradients in absorbed hydrogen.

In terms of cycle life stability and long cycle life, large hysteresis is undesirable because large gradients in the absorbed hydrogen concentration tend to promote pulverization or spalling effects upon repeated cycling in a manner illustrated in FIG. 2. It is known in the art that the absorption of hydrogen in a metal hydride material is accompanied by an expansion of the metal hydride lattice volume as the atoms of the metal hydride are repositioned to accommodate absorbed hydrogen. The magnitude of the lattice expansion depends on the alloy composition and ranges from small to large. (See, for example, the article entitled "The correlation between composition and electrochemical properties of metal hydride electrodes" by J. J. Reilly et al. appearing in the Journal of Alloys and Compounds, vol. 293-295, p. 569-582 (1999).)

The effect of lattice expansion on the cycle life characteristics is expected to differ for small and large hysteresis metal hydride materials. In small hysteresis materials, the absorbed hydrogen is more nearly uniformly distributed throughout the lattice of the metal hydride material so that lattice expansion occurs substantially uniformly throughout the material. In large hysteresis materials, the absorbed hydrogen exhibits a significant concentration gradient so that the concentration of hydrogen in some portions of the material is much different than the concentration in other portions of the material. As a result, lattice expansion effects occur non-uniformly as regions of high absorbed hydrogen concentration expand to a greater degree than regions of low absorbed hydrogen concentration. A differential lattice expansion occurs due to the concentration gradient as high concentration regions expand more than low concentration regions.

Differential lattice expansion is detrimental to cycle life because it introduces internal stresses into the metal hydride lattice. A difference in lattice constants between adjacent regions of a metal hydride material causes a stress to form at the interface between those regions. The stress is due to a mismatch in lattice parameters as the preferred atomic positions in the neighboring regions differ due to a difference in absorbed hydrogen concentration. The greater is the difference in lattice constants, the greater the stress is. A metal hydride material is able to support stresses up to a maximum value that is characteristic of the material. The material accommodates or relieves the stress through distortions in atomic positions from their thermodynamically preferred locations. If the stress exceeds this stress limit, the metal hydride material is unable to support the stress and relieves the stress by fracturing. The instant inventors believe that this fracturing is the cause of the particle size pulverization that occurs in large hysteresis metal hydride materials upon cycling. Repeated cycling causes the repeated creation and elimination of internal stresses that, over time, fatigue the metal hydride material and progressively degrade the average particle size.

The instant inventors thus believe that the larger hysteresis observed for the B1 and B12 alloys relative to the B alloy in the PCT curves shown in FIG. 3 indicates the presence of greater energetic barriers to the absorption and desorption of hydrogen and that these larger barriers lead to: greater concentration gradients in absorbed hydrogen, larger differential lattice expansion effects, larger internal stresses, an increased tendency to pulverize and a reduced cycle life.

Figure 4:
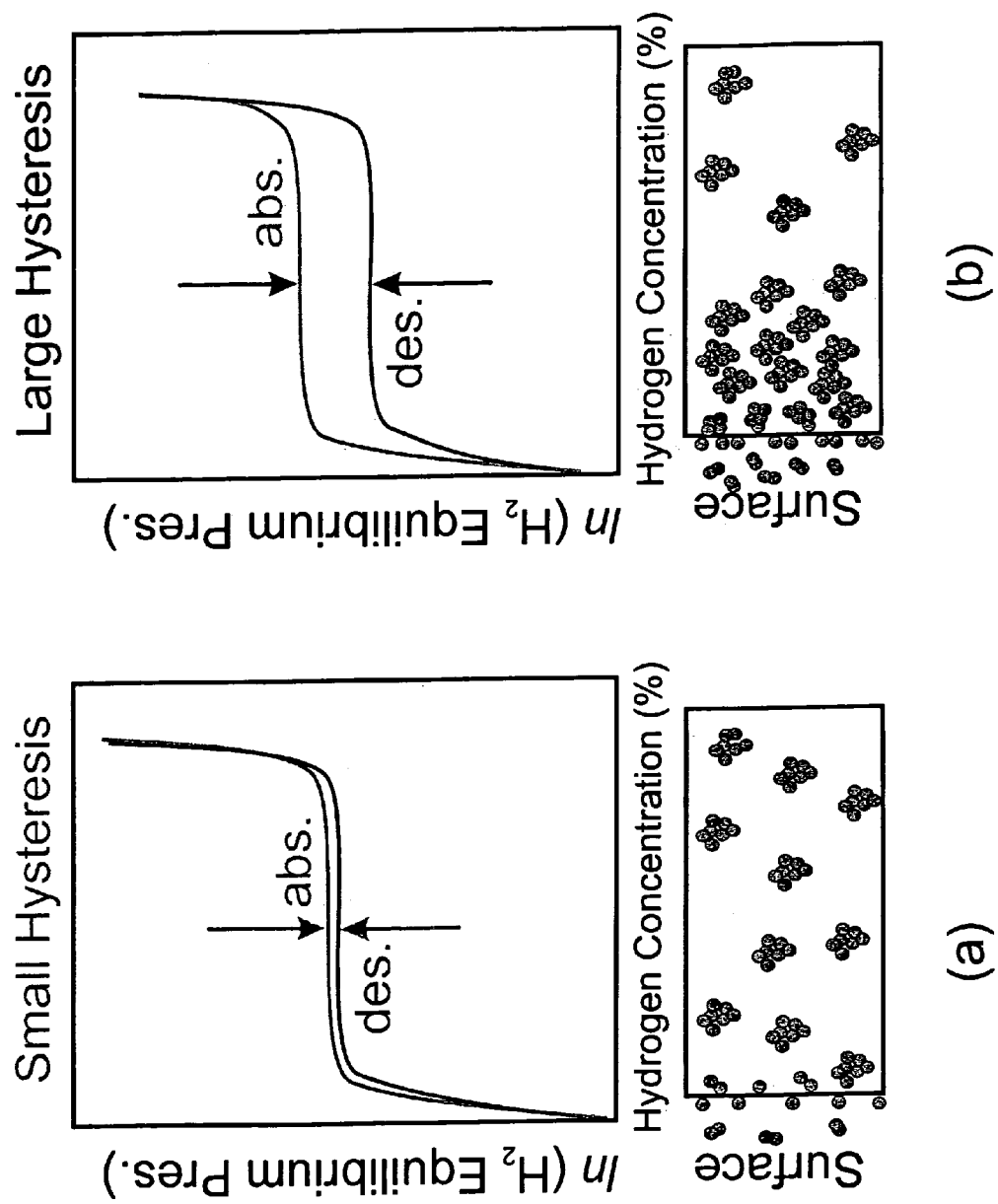
FIG. 4. Schematic depiction of PCT plots of alloys exhibiting small (a) and large (b) hysteresis as well as schematic depictions of the concentration gradients in absorbed hydrogen associated therewith.
Figure 5:
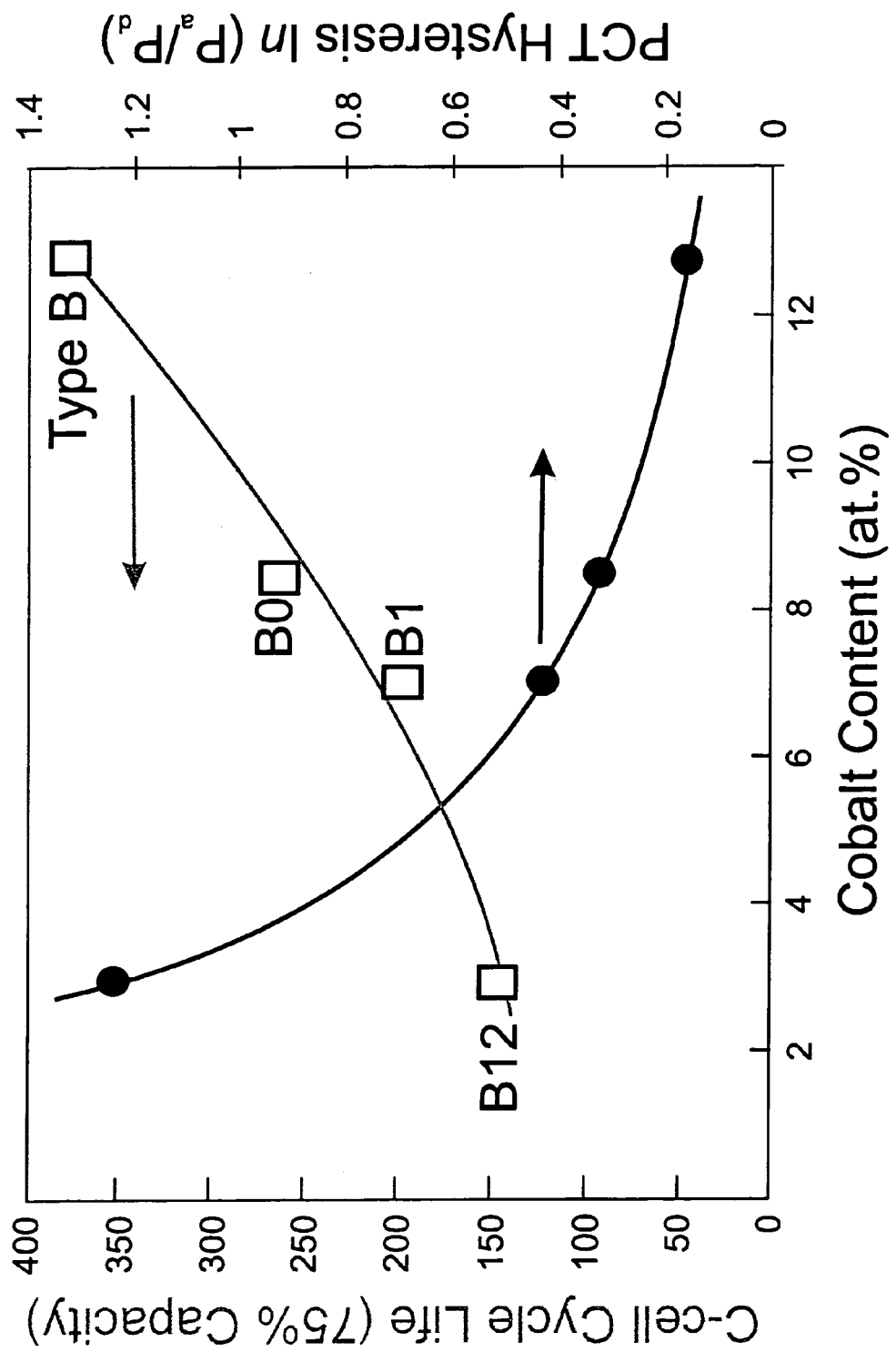
FIG. 5. A correlation of the C-cell cycle life and one measure of hysteresis for the B, B0, B1 and B12 alloys plotted as a function of the Co concentration of the alloy.

Experimental evidence supporting the belief that hysteresis is a reliable metric for assessing cycle life is shown in FIG. 5, which shows the C-cell cycle life of a series of batteries that include different metal hydride negative electrode materials. The C-cell cycle life is reported as the number of cycles required for the battery performance to decrease to 75% capacity and is correlated with one measure of the extent of hysteresis. According to this measure, hysteresis is reported as the natural logarithm (ln) of the ratio of the absorption plateau pressure ($P_a$) to the desorption plateau pressure ($P_d$) for each of the batteries at a common weight percent of absorbed hydrogen. This measure of hysteresis is a measure of the vertical displacement of the absorption isotherm relative to the desorption isotherm at a particular absorbed hydrogen concentration in a PCT plot. The hydrogen concentration is selected from the plateau region of the PCT curve. In FIG. 4, for example, the arrows depict the absorption and desorption pressures at a particular absorbed hydrogen concentration and it is evident that the vertical displacement between the absorption and desorption isotherms at the chosen absorbed hydrogen concentration is much greater for a large hysteresis material than for a small hysteresis material. An alternative measure of hysteresis is described hereinbelow.

The C-cell cycle life and PCT hysteresis as measured by $\ln(P_a/P_d)$ are reported in FIG. 5 for the B, B0, B1 and B12 alloys, where the alloy compositions are given in Table 1 hereinabove. For convenience, the alloys are plotted according to the amount of Co present in the composition. Two data points are presented for each alloy: one (filled circle) for the C-cell cycle life when the alloy is incorporated as the negative electrode material and one (open square) for the PCT hysteresis of the alloy. The results show an inverse correlation between C-cell cycle life and hysteresis. The B alloy shows the greatest C-cell cycle life and the lowest hysteresis, while the B12 alloy shows the poorest C-cell cycle life and the greatest hysteresis. The B0 and B1 alloys show intermediate results. The results also indicate, as described hereinabove, that a higher Co concentration promotes cycle life and reduces hysteresis.

This example shows that long cycle life is associated with small hysteresis effects and indicates that cycle life can be promoted through the development of metal hydride alloys exhibiting small hysteresis effects.

EXAMPLE 4

In this example, the preparation and formulas of several metal hydride materials according to the instant invention are described. The instant metal hydride materials exhibit low hysteresis effects and excellent low temperature characteristics as will be described in other examples hereinbelow. The alloys further include a lower concentration of Co than is typically used in commercial metal hydrides. The alloys of this example are $AB_5$ type alloys. Each alloy was prepared by combining mischmetal and the remaining components in elemental form (purity of each element >99%) in the required stoichiometric ratio in an MgO crucible. The mischmetal used in this example included La, Ce, Pr, and Nd in a molar ratio of La:Ce:Pr:Nd=10.5:4.3:0.5:1.4 (Type B alloys) and 5.2:8.1:0.9:2.5 (Type C alloys). The total mass of the combined starting elements was approximately 2 kg. The crucible was subsequently placed into a water-cooled induction furnace under a 1 atm. argon atmosphere, heated to about 1350°

C. and held at that temperature for 15-20 minutes. During heating, the material in the crucible melted and became superheated to provide better homogeneity. After this heating step, the material was cooled down to just slightly above its melting point (ca. 1280° C.) and immediately poured into a steel mold through a tundish. After pouring, the material was cooled to room temperature. The resulting ingot was then annealed at a temperature between 950° C. and 1050° C. for a time period ranging from 5-12 hours in a vacuum chamber pumped by a diffusion pump. After annealing, the ingot was returned to room temperature. The cooled ingot was then mechanically pulverized and sieved through a 200 mesh filter. Rare earths may also be combined in the form of individual elements.

Representative $AB_5$ alloys in accordance with the instant invention and prepared using the above method are presented in Tables 2 and 3. In these alloys, component A is the mischmetal described above and component B is a combination of transition metals, as shown in Tables 2 and 3. The compositions shown in Tables 2 and 3 are in at. % and also correspond to molar proportions. Entries of 0 indicate that the element was not intentionally included in the preparation of the alloy.

In Table 2 (B-type alloys), the alloys B18, B19, B20, B21, B22, B23, B24, B27, and B28 include the microstructure modifying element Cu described in the '008 application and further include a cycle life enhancement element according to the instant invention. The alloys B18, B19, B20, B21, B22, B23 and B24 include Zr as a cycle life enhancement element, alloys B25 and B26 include Si as a cycle life enhancement element and alloys B27 and B28 include Zr and Si as cycle life enhancement elements.

In Table 3 (C-type alloys), the alloys C1 and C4 include the microstructure modifying element Cu described in the '008 application. The alloys C18, C19, C20, C21, C22, C23, C24, C27, and C28 include the microstructure modifying element Cu described in the '008 application and further include a cycle life enhancement element according to the instant invention. The alloys C18, C19, C20, C21, C22, C23, and C24 include Zr as a cycle life enhancement element, while the alloys C27 and C28 include Si as a cycle life enhancement element. The alloys C25 and C26 do not include Cu, but do include Si as a cycle life enhancement element.

TABLE 2

| Alloy | La | Ce | Pr | Nd | Ni | Co | Mn | Al | Cu | Zr | Si |
|---|---|---|---|---|---|---|---|---|---|---|---|
| B18 | 10.5 | 4.3 | 0.5 | 1.4 | 64.5 | 5.0 | 4.6 | 6.0 | 1.7 | 1.7 | 0 |
| B19 | 10.5 | 4.3 | 0.5 | 1.4 | 64.5 | 5.0 | 4.6 | 6.0 | 2.3 | 1.1 | 0 |
| B20 | 10.5 | 4.3 | 0.5 | 1.4 | 62.8 | 5.0 | 4.6 | 6.0 | 3.4 | 1.7 | 0 |
| B21 | 10.5 | 4.3 | 0.5 | 1.4 | 64.0 | 5.0 | 4.6 | 6.0 | 3.4 | 0.5 | 0 |
| B22 | 10.5 | 4.3 | 0.5 | 1.4 | 64.3 | 5.0 | 4.6 | 6.0 | 3.4 | 0.2 | 0 |
| B23 | 10.5 | 4.3 | 0.5 | 1.4 | 64.5 | 5.0 | 4.6 | 6.0 | 2.9 | 0.5 | 0 |
| B24 | 10.5 | 4.3 | 0.5 | 1.4 | 64.5 | 5.0 | 4.6 | 6.0 | 3.2 | 0.2 | 0 |
| B25 | 10.5 | 4.3 | 0.5 | 1.4 | 64.38 | 8.28 | 4.48 | 5.88 | 0 | 0 | 0.5 |
| B26 | 10.5 | 4.3 | 0.5 | 1.4 | 64.25 | 8.15 | 4.35 | 5.75 | 0 | 0 | 1.0 |
| B27 | 10.5 | 4.3 | 0.5 | 1.4 | 64.4 | 4.9 | 4.5 | 5.9 | 3.3 | 0 | 0.5 |
| B28 | 10.5 | 4.3 | 0.5 | 1.4 | 64.3 | 4.8 | 4.4 | 5.8 | 3.2 | 0 | 1.0 |
| B35 | 10.5 | 4.3 | 0.5 | 1.4 | 64.5 | 8.4 | 4.6 | 6.0 | 0 | 0 | 0 |

TABLE 3

| Alloy | La | Ce | Pr | Nd | Ni | Co | Mn | Al | Cu | Zr | Si |
|---|---|---|---|---|---|---|---|---|---|---|---|
| C | 5.2 | 8.1 | 0.9 | 2.5 | 59.1 | 13.0 | 5.9 | 5.3 | 0 | 0 | 0 |
| C0 | 4.4 | 8.7 | 0.9 | 2.6 | 64.5 | 8.4 | 4.6 | 6.0 | 0 | 0 | 0 |
| C1 | 4.4 | 8.7 | 0.9 | 2.6 | 64.5 | 5.0 | 4.6 | 6.0 | 3.4 | 0 | 0 |
| C4 | 4.4 | 8.7 | 0.9 | 2.6 | 65.9 | 5.0 | 4.6 | 6.0 | 2.0 | 0 | 0 |
| C18 | 4.4 | 8.7 | 0.9 | 2.6 | 64.5 | 5.0 | 4.6 | 6.0 | 1.7 | 1.7 | 0 |

TABLE 3-continued

| Alloy | La | Ce | Pr | Nd | Ni | Co | Mn | Al | Cu | Zr | Si |
|---|---|---|---|---|---|---|---|---|---|---|---|
| C19 | 4.4 | 8.7 | 0.9 | 2.6 | 64.5 | 5.0 | 4.6 | 6.0 | 2.3 | 1.1 | 0 |
| C20 | 4.4 | 8.7 | 0.9 | 2.6 | 62.8 | 5.0 | 4.6 | 6.0 | 3.4 | 1.7 | 0 |
| C21 | 4.4 | 8.7 | 0.9 | 2.6 | 64.0 | 5.0 | 4.6 | 6.0 | 3.4 | 0.5 | 0 |
| C22 | 4.4 | 8.7 | 0.9 | 2.6 | 64.3 | 5.0 | 4.6 | 6.0 | 3.4 | 0.2 | 0 |
| C23 | 4.4 | 8.7 | 0.9 | 2.6 | 64.5 | 5.0 | 4.6 | 6.0 | 2.9 | 0.5 | 0 |
| C24 | 4.4 | 8.7 | 0.9 | 2.6 | 64.5 | 5.0 | 4.6 | 6.0 | 3.2 | 0.2 | 0 |
| C25 | 4.4 | 8.7 | 0.9 | 2.6 | 64.38 | 8.28 | 4.48 | 5.88 | 0 | 0 | 0.5 |
| C26 | 4.4 | 8.7 | 0.9 | 2.6 | 64.25 | 8.15 | 4.35 | 5.75 | 0 | 0 | 1.0 |
| C27 | 4.4 | 8.7 | 0.9 | 2.6 | 64.4 | 4.9 | 4.5 | 5.9 | 3.3 | 0 | 0.5 |
| C28 | 4.4 | 8.7 | 0.9 | 2.6 | 64.3 | 4.8 | 4.4 | 5.8 | 3.2 | 0 | 1.0 |

EXAMPLE 5

In this example, a measure of hysteresis is described that will be used in the evaluation and analysis of the PCT characteristics of the instant alloys in several examples presented hereinbelow. As described in EXAMPLE 3 hereinabove, one measure of hysteresis is a determination of the ratio of the pressure along the absorption isotherm ($P_a$) to the pressure along the desorption isotherm ($P_d$) at a particular absorbed hydrogen concentration in the plateau region. While this measure of hysteresis is widely used in the art and provides guidance as to differences between the absorption and desorption isotherms, it is believed by the instant inventors to be an incomplete indicator of the physical mechanisms underlying hysteresis. As described in EXAMPLE 3 hereinabove, hysteresis is a reflection of the activation barriers associated with the introduction and mobility of hydrogen in a metal hydride or other hydrogen storage material. Materials exhibiting large hysteresis are characterized by large activation barriers and vice versa. Thus, in order to best describe hysteresis, it is desirable to identify a property of the PCT curves that correlates with the activation barrier.

FIG. 6 presents a measure of hysteresis that the instant inventors believe to be a more effective measure than the logarithmic measure ($\ln(P_a/P_d)$) commonly used in the prior art. FIG. 6 presents two schematic PCT plots, each of which shows an absorption isotherm (upper curve) and desorption isotherm (lower curve). The PCT plots present the dependence of the hydrogen pressure as a function of absorbed hydrogen concentration for the absorption and desorption isotherms. Each plot further includes an intermediate dashed curve located between the absorption and desorption isotherms and introduces the maximum concentration difference (abbreviated MCD) as a measure of hysteresis. As shown in FIG. 6, the maximum concentration difference is a measure of the horizontal displacement of the absorption isotherm relative to the dashed curve. The appropriateness of maximum concentration difference as a measure of hysteresis stems from the physical significance of the dashed curve. Specifically, the dashed curve corresponds to a hypothetical or theoretical situation in which no activation barrier to the introduction and mobility of absorbed hydrogen in the metal hydride material is present. The maximum concentration difference is thus a measure of the difference between the concentration of hydrogen that would be absorbed in the metal hydride in the absence of an activation barrier and the actual amount of hydrogen absorbed at a particular pressure. The larger the maximum concentration is, the larger is the activation barrier and the greater is the driving force needed to drive hydrogen into the material.

Placement of the dashed curve can be achieved rigorously through a theoretical analysis that accounts for the activation barriers associated the incorporation and extraction of hydrogen from the metal hydride material. Oftentimes, however, the parameters needed for such an analysis are unknown or difficult to obtain and it is more convenient operationally to approximate a rigorous theoretical version of the dashed curve with a close approximation thereof. In the instant invention, the dashed curve used in the determination of the maximum concentration difference is obtained as the locus of vertical midpoints between the absorption and desorption isotherms of a metal hydride material. Thus, the dashed curves shown in panels (a) and (b) of FIG. 6 are obtained for each abscissa point by taking the average of the pressures along the absorption and desorption isotherms for that point. The set of all such points forms the dashed curve used in determining maximum concentration difference in the instant invention. The horizontal difference between the absorption isotherm and the dashed curve is referred to herein as a concentration difference and is generally reported in terms of weight percent (wt. %) absorbed hydrogen. As is evident from the appearance of the PCT plot, several horizontal concentration differences may be determined for a metal hydride material. Of the different possible horizontal concentration differences that may be determined for a metal hydride material based on its PCT curve, the one having the maximum value is referred to herein as the maximum concentration difference and is used herein as a measure of the hysteresis of a metal hydride material. The maximum concentration difference is thus the greatest horizontal separation between the absorption isotherm and the dashed curve and is believed by the instant inventors to be the most effective measure of hysteresis, pulverization, lattice stresses upon hydriding etc. of metal hydride materials.

Consider, by way of example, panel (a) of FIG. 6. This panel shows that the maximum concentration difference occurs at the indicated pressure $P_a$. The maximum concentration difference is depicted as a horizontal segment at $P_a$ that extends from the absorption isotherm to the dashed line. When superimposed on the horizontal axis, the length of this segment provides a numerical value for the maximum concentration difference. The horizontal segment is defined by a right endpoint that corresponds to the concentration of hydrogen that would be absorbed at a pressure $P_a$ if the metal hydride material possessed no barrier to the incorporation of hydrogen and a left endpoint that corresponds to the actual concentration of hydrogen absorbed at $P_a$. A large difference between these two absorbed hydrogen concentrations signifies a large activation barrier and indicates that a large driving force is needed to incorporate hydrogen within the metal hydride material. Panel (a) of FIG. 6 is an example of a material having a large maximum concentration difference. Panel (b) of FIG. 6, in contrast, is an example of a material having a small maximum concentration difference. Panel (b) of FIG. 6 shows the maximum concentration difference at $P_a$ and it is evident that the maximum concentration difference of panel (b) of FIG. 6 is much smaller than the maximum concentration difference of panel (a) of FIG. 6. A small maximum concentration difference indicates that the activation barrier to the incorporation of hydrogen into the metal hydride material is small and that the driving force required to incorporate hydrogen is small. This follows from the similarity of the theoretically and actually absorbed concentrations of hydrogen in a material having a small maximum concentration difference. In the limiting case of a vanishing maximum concentration difference, theoretical (dashed) isotherm and the actual (experimental) absorption isotherm would coincide. (The absorption and desorption isotherms would also coincide in this limiting case.)

In terms of hysteresis, a material having a large maximum concentration difference shows a large hysteresis effect and is accordingly expected to exhibit poor cycle life characteristics and significant pulverization upon repeated cycling. Similarly, a material having a small maximum concentration difference shows a small hysteresis effect and is accordingly expected to exhibit good cycle life characteristics and more gradual pulverization upon repeated cycling. Materials having a large maximum concentration difference are expected to exhibit larger gradients in the concentration of absorbed hydrogen than materials having a small maximum concentration difference. The internal stresses that develop in materials having a large maximum concentration difference are accordingly larger than those that develop in materials having a small maximum concentration difference, with the result that materials having a large maximum concentration difference are more susceptible to pulverization and particle size degradation upon repeated cycling.

Since the maximum concentration difference is based on the underlying energy barriers and driving forces associated with the incorporation of absorbed hydrogen and is a manifestation of the concentration gradients of absorbed hydrogen that lead to internal stresses and pulverization, the instant inventors believe that it is a better measure of hysteresis than the conventional logarithmic ($\ln(P_a/P_d)$) measure of hysteresis. FIG. 6 provides an example of how maximum concentration difference is distinct from $\ln(P_a/P_d)$ as a measure of hysteresis. Panels (a) and (b) of FIG. 6 are PCT plots of large and small hysteresis materials, respectively, when viewed in terms of maximum concentration difference as a measure of hysteresis. If viewed in terms of $\ln(P_a/P_d)$ as measure of hysteresis, however, the two materials would be deemed to have the same degree of hysteresis because the vertical displacement between the absorption and desorption isotherms is the same for the materials depicted in panels (a) and (b). FIG. 6 thus shows that the underlying activation barriers, concentration gradients etc. of two materials having the same traditional logarithmic measure of hysteresis can be quite different. The maximum concentration difference measure of hysteresis accounts for such differences and provides a more complete indicator of the cycling characteristics of a metal hydride material.

The traditional logarithmic measure of hysteresis may provide a reliable comparison of the cycle life properties of different metal hydride alloys when the slopes of the absorption and desorption isotherms of the different metal hydride alloys are similar. This conclusion follows because similarity in slopes in a comparison of different materials means that a vertical displacement measure of hysteresis is a reasonable substitute for a measure of hysteresis based on horizontal displacement. When the materials being compared, however, have absorption and desorption isotherms that differ appreciably in slope, maximum concentration difference becomes a better measure of hysteresis. As shown in FIG. 6, for example, materials having a large maximum concentration difference generally have PCT plateaus that are flat or weakly sloping (panel (a)), while materials having a small maximum concentration difference generally have PCT plateaus that are more strongly sloped (panel (b)).

EXAMPLE 6

In this example, the PCT and hysteresis characteristics of several of the instant alloys are described. PCT curves are measured upon absorption and desorption of hydrogen at 30° C. and hysteresis is determined through a comparison of the absorption and desorption isotherms. Hysteresis is assessed primarily in terms of the maximum concentration difference described in EXAMPLE 5 hereinabove. The conventional logarithmic ($\ln(P_a/P_d)$) measure of hysteresis may also be referred to. The alloys considered in this example include Zr as a cycle life enhancement element.

Figure 7:
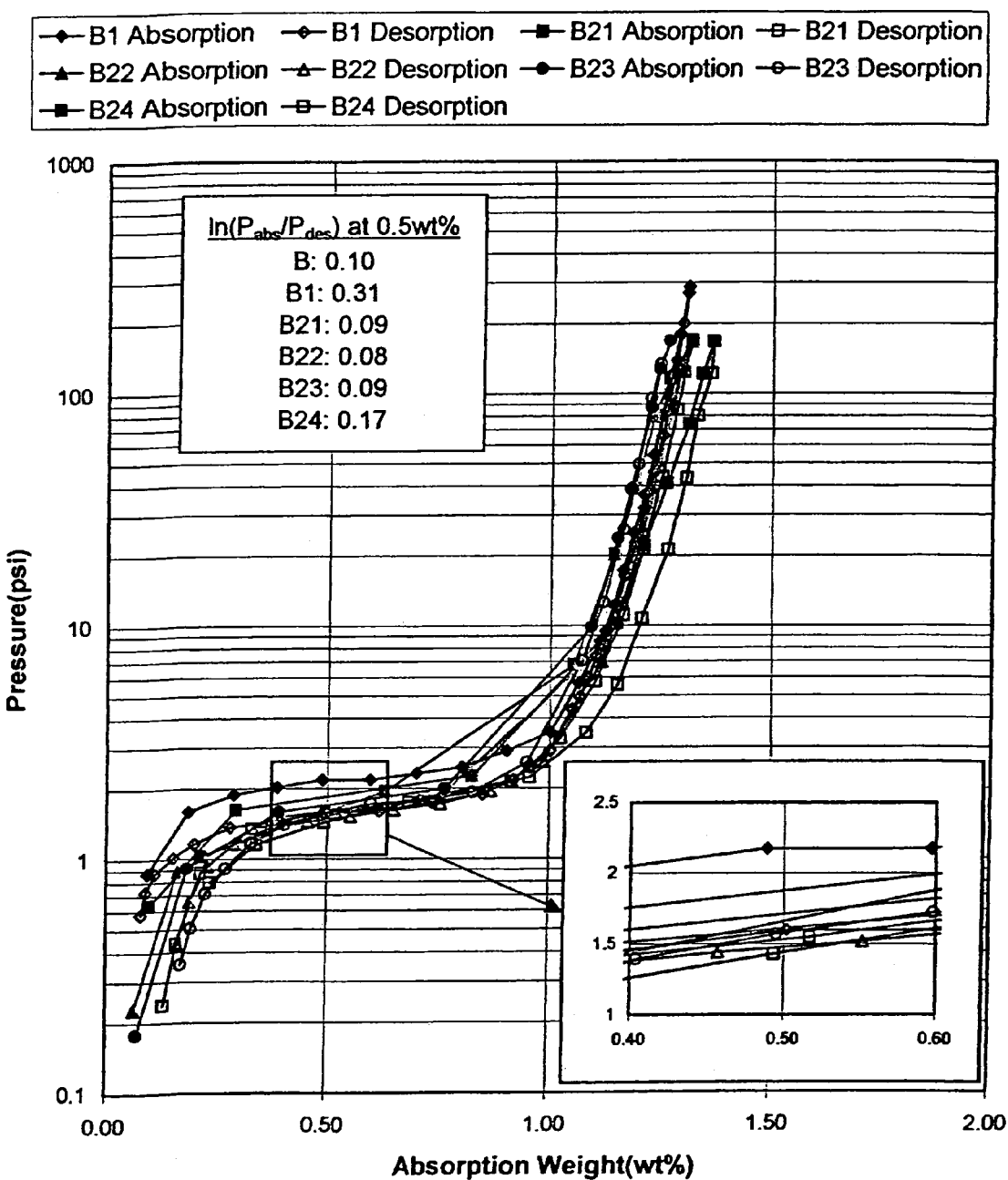
FIG. 7. PCT plot of the B1, B21, B22, B23 and B24 alloys at 30° C.

FIG. 7 shows the PCT curves of the instant B21, B22, B23, and B24 alloys at 30° C. The curves show the dependence of hydrogen pressure (plotted on a logarithmic scale) on the weight percent of absorbed hydrogen. Absorption and desorption isotherms are shown for each alloy and a comparison is made to the B1 alloy. Like the B1 alloy, the B21, B22, B23, and B24 alloys include Cu as a microstructure tuning element designed to achieve excellent low temperature characteristics as described in the '008 application. The PCT isotherms were analyzed and the hysteresis associated with each of the alloys was determined. The conventional logarithmic measure of hysteresis is shown in the inset of FIG. 7 for each alloy at an absorption weight percent of 0.5. The maximum concentration difference (MCD) of each alloy was also obtained from the PCT plot and the following results were obtained, where MCD is expressed in units of weight percent (wt %) absorbed hydrogen:

| Alloy | MCD |
|---|---|
| B | 0.06 |
| B1 | 0.20 |
| B12 | 0.33 |
| B21 | 0.06 |
| B22 | 0.09 |
| B23 | 0.09 |
| B24 | 0.13 |

MCD values for the B and B12 alloys were also determined and are shown for comparison purposes (the absorption and desorption isotherms for the B and B12 alloys are not included in FIG. 7). The results of this example indicate that the hysteresis of the instant B21, B22, B23, and B24 alloys is much lower than the hysteresis of the B1 and B12 alloys of the '008 application. The hysteresis of the instant B21, B22, B23 and B24 alloys is comparable to the hysteresis of the B alloy. As a result, the cycle life characteristics of the instant B21, B22, B23, and B24 alloys are expected to be similar to those of the B alloy (see, for example, FIG. 1 hereinabove) and better than those of the B1 and B12 alloys.

EXAMPLE 7

In this example, the PCT and hysteresis characteristics of several of the instant alloys are described. PCT curves are measured upon absorption and desorption of hydrogen at 30° C. and hysteresis is determined through a comparison of the absorption and desorption isotherms. Hysteresis is assessed primarily in terms of the maximum concentration difference described in EXAMPLE 5 hereinabove. The conventional logarithmic ($\ln(P_a/P_d)$) measure of hysteresis may also be referred to. The alloys considered in this example include Zr as a cycle life enhancement element.

Figure 8:
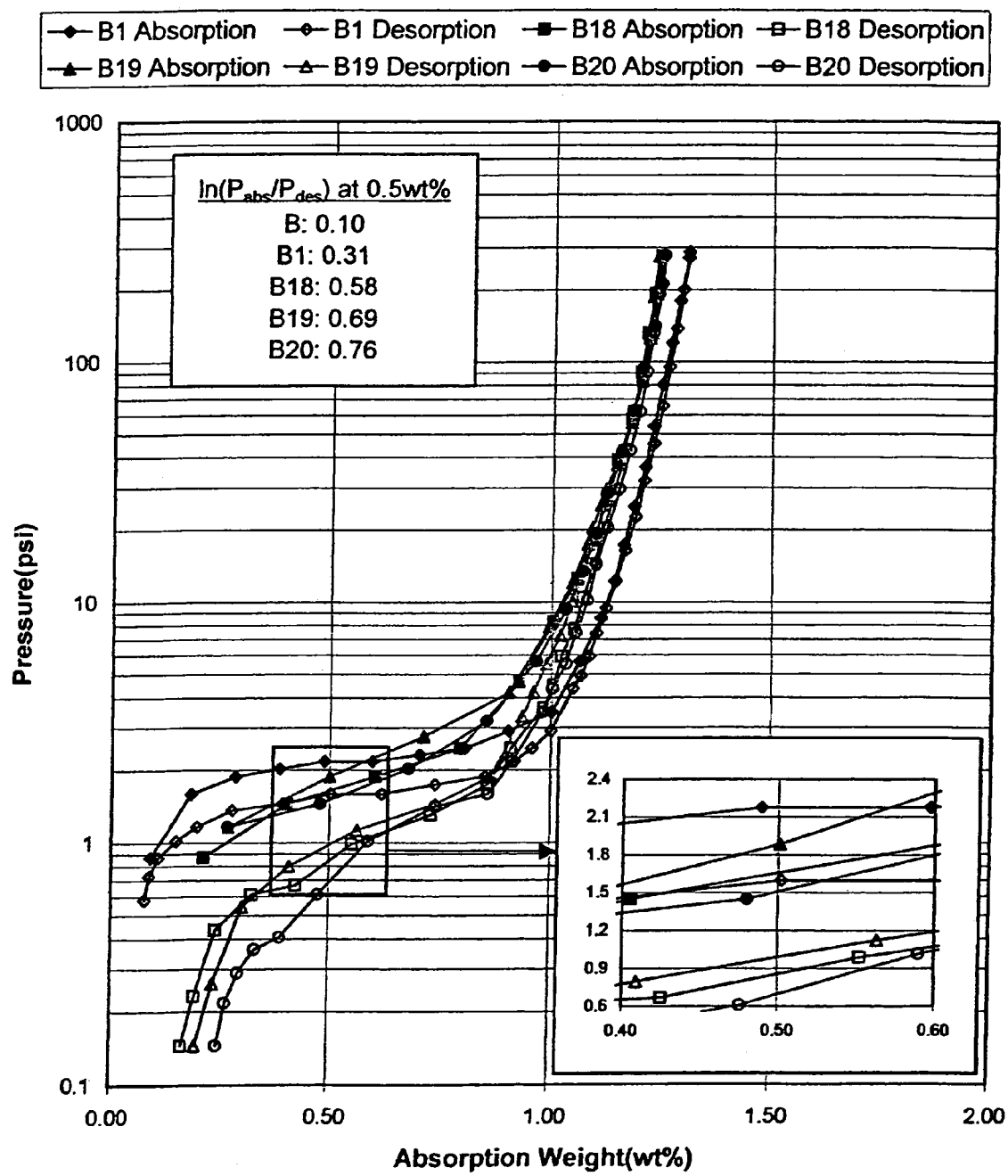
FIG. 8. PCT plot of the B1, B21, B22, B23 and B24 alloys at 30° C.

FIG. 8 shows the PCT curves of the instant B18, B19, and B20 alloys at 30° C. The curves show the dependence of hydrogen pressure (plotted on a logarithmic scale) on the weight percent of absorbed hydrogen. Absorption and desorption isotherms are shown for each alloy and a comparison is made to the B1 alloy. Like the B1 alloy, the B18, B19, and B20 alloys include Cu as a microstructure tuning element designed to achieve excellent low temperature characteristics as described in the '008 application. The PCT isotherms were analyzed and the hysteresis associated with each of the alloys was determined. The conventional logarithmic measure of hysteresis is shown in the inset of FIG. 8 for each alloy at an absorption weight percent of 0.5. The maximum concentration difference (MCD) of each alloy was also obtained from the PCT plot and the following results were obtained, where MCD is expressed in units of weight percent. (wt %) absorbed hydrogen:

| Alloy | MCD |
|---|---|
| B | 0.06 |
| B1 | 0.20 |
| B12 | 0.33 |
| B18 | 0.17 |
| B19 | 0.20 |
| B20 | 0.22 |

MCD values for the B and B12 alloys are shown for comparison purposes. The results of this example indicate that the hysteresis of the instant B18, B19, and B20 alloys is comparable to that of the B1 alloy when using MCD as a measure of hysteresis and greater than that of the B1 alloy when using the conventional logarithmic measure of hysteresis. These results indicate that the cycle life characteristics of the instant B18, B19 and B20 alloys should be comparable to and not appreciable better than the cycle life characteristics of the B1 alloy presented in FIG. 1 hereinabove. The hysteresis characteristics of the B18, B19 and B20 alloys are, however, improved relative to the B12 alloy according to the MCD measure of hysteresis.

The hysteresis observed for the B18, B19, and B20 alloys of this example is greater than the hysteresis observed for the B21, B22, B23, and B24 alloys described in EXAMPLE 6 hereinabove. The greater hysteresis in this example is due to the higher Zr concentration present in the B18, B19 and B20 alloys relative to the B21, B22, B23, and B24 alloys of EXAMPLE 6. The instant inventors have determined that the beneficial hysteresis effects associated with Zr as a cycle life enhancement modifier occur preferentially within a particular range of Zr concentration. The results indicate that hysteresis effects are lowest for Zr concentrations up to about 0.5 at. % and that the hysteresis increases as the Zr concentration is increased above about 1.0 at. %.

X-ray diffraction measurements of the C20 alloy (which has 1.7 at. % Zr) indicate the presence of Zr-rich precipitates, while x-ray diffraction measurements of the C21 alloy (which has 0.5 at. % Zr) indicate the absence of Zr-rich precipitates. The x-ray diffraction results indicate that as the Zr concentration is increased, there is a tendency for Zr to nucleate out in a separate Zr-rich phase to produce a heterogeneous alloy. The instant PCT results indicate that precipitation of a Zr-rich phase increases hysteresis and is thus expected to deleteriously impact the cycle life characteristics of the alloy. It is accordingly preferable to include Zr at a concentration sufficient to reduce hysteresis, while minimizing the precipitation of Zr-rich phases. In a preferred embodiment, the metal hydride material is a homogeneous phase $AB_5$ material that comprises Zr.

In one embodiment herein, the Zr concentration is less than or equal to 1.7 at. %. In another embodiment herein, the Zr concentration is less than or equal to 1.1 at. %. In yet another embodiment herein, the Zr concentration is less than or equal to 0.5 at. %. In still another embodiment herein, the Zr concentration is less than or equal to 0.2 at. %. Preferred inclusive Zr concentration ranges include the ranges 0.2 at. %-1.7 at. %, 0.2 at. %-0.5 at. %, 0.5 at. %-1.1 at. %, and 0.2 at. %-1.1 at. %.

EXAMPLE 8

In this example, the PCT and hysteresis characteristics of several of the instant alloys are described. PCT curves are measured upon absorption and desorption of hydrogen at 30° C. and hysteresis is determined through a comparison of the absorption and desorption isotherms. Hysteresis is assessed primarily in terms of the maximum concentration difference described in EXAMPLE 5 hereinabove. The conventional logarithmic ($\ln(P_a/P_d)$) measure of hysteresis may also be referred to. The alloys considered in this example include Si as a cycle life enhancement element.

Figure 9:
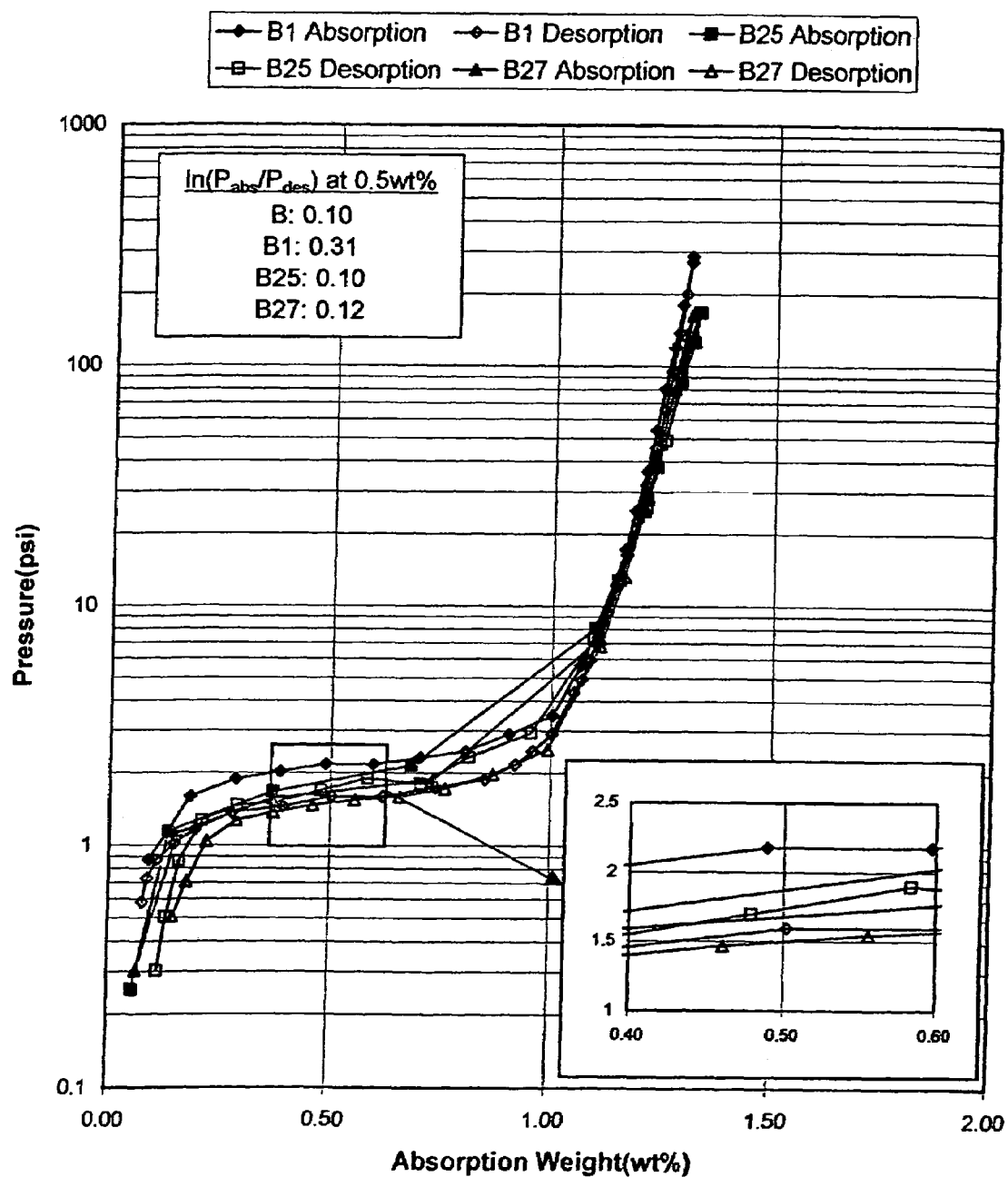
FIG. 9. PCT plot of the B1, B25, and B27 alloys at 30° C.
Figure 10:
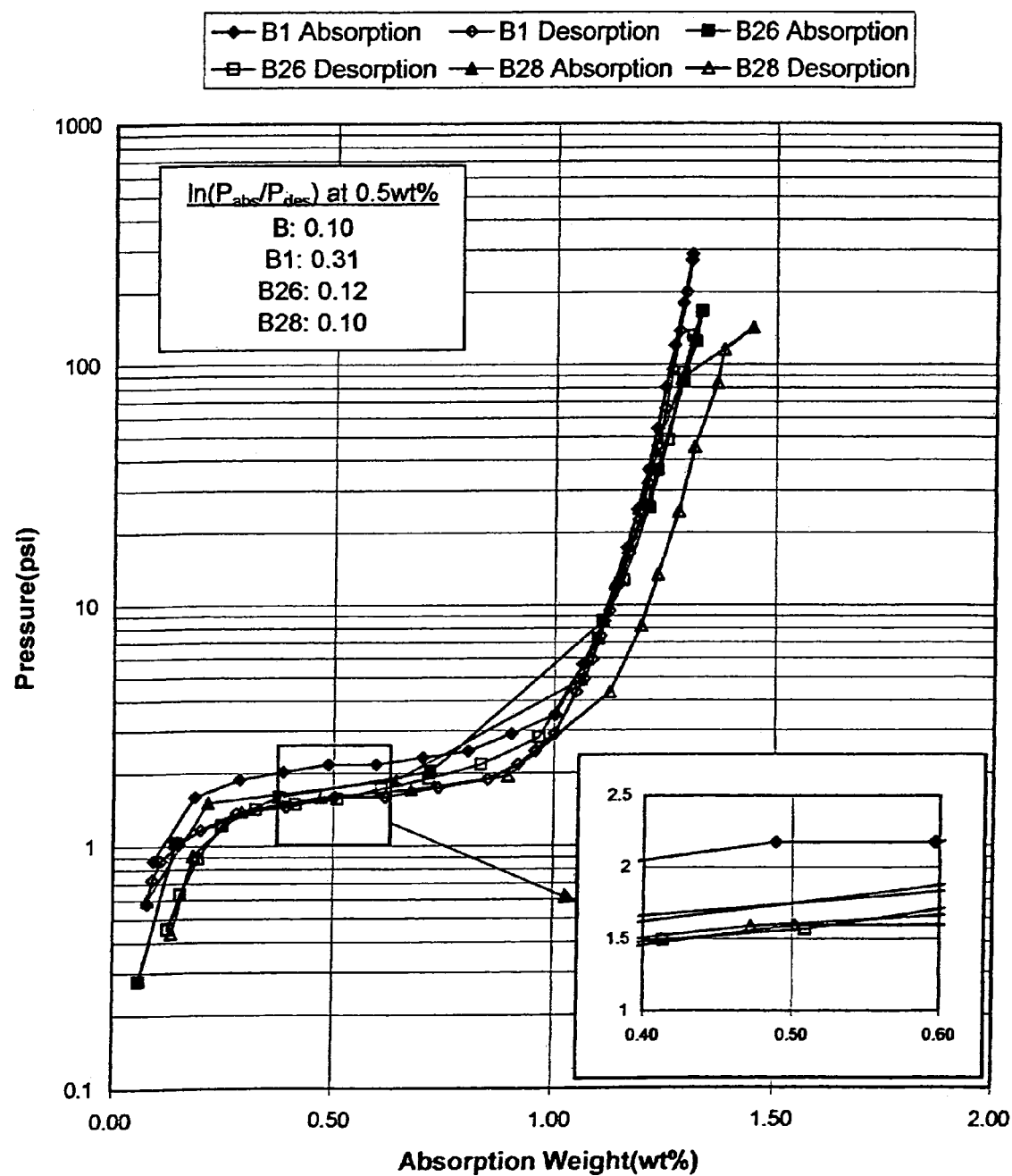
FIG. 10. PCT plot of the B1, B26, and B28 alloys at 30° C.

FIGS. 9 and 10 show the PCT curves of the instant B25, B26, B27, and B28 alloys at 30° C. The curves show the dependence of hydrogen pressure (plotted on a logarithmic scale) on the weight percent of absorbed hydrogen. Absorption and desorption isotherms are shown for each alloy and a comparison is made to the B1 alloy. The B25 and B27 alloys both include 0.5 at. % Si and differ with respect to the Co and Cu concentration. The B25 alloy includes no Cu and a higher Co concentration than the B27 alloy. In the B27 alloy, some of the Co has been replaced by Cu. The B25 and B27 alloys are otherwise similar in composition. The B26 and B28 alloys both include 1.0 at. % Si and differ with respect to the Co and Cu concentration. The B26 alloy includes no Cu and a higher Co concentration than the B28 alloy. In the B28 alloy, some of the Co has been replaced by Cu. The B26 and B28 alloys are otherwise similar in composition.

The PCT isotherms were analyzed and the hysteresis associated with each of the alloys was determined. The conventional logarithmic measure of hysteresis is shown in the inset of FIGS. 9 and 10 for each alloy at an absorption weight percent of 0.5. The maximum concentration difference (MCD) of each alloy was also obtained from the PCT plot and the following results were obtained, where MCD is expressed in units of weight percent (wt %) absorbed hydrogen:

| Alloy | MCD |
|---|---|
| B | 0.06 |
| B1 | 0.20 |
| B12 | 0.33 |
| B25 | 0.13 |
| B26 | 0.13 |
| B27 | 0.09 |
| B28 | 0.12 |

MCD values for the B and B12 alloys are shown for comparison purposes. The results of this example indicate that the hysteresis of the instant B25, B26, B27, and B28 alloys is much lower than the hysteresis of the B1 and B12 alloys and comparable to the hysteresis of the B alloy. These results indicate that the cycle life characteristics of the instant B25, B26, B27 and B28 alloys should be better than the cycle life characteristics of the B1 alloy presented in FIG. 1 hereinabove.

This example shows that the inclusion of Si as a modifier reduces hysteresis and leads to the expectation that inclusion of Si will improve the cycle life characteristics. The alloys of this example are of further interest because the compositions considered involve the substitution of Cu for Co in the composition in the presence of Si as a cycle life enhancement modifier. As discussed in the '008 application, one goal in producing metal hydride alloys, regardless of operating temperature, is a minimization of alloy cost. Co is one of the more expensive components in metal hydride alloys and it is desirable to minimize its concentration. It is generally believed in the art, however, that Co is an advantageous element because its presence leads to longer cycle life and improved cycle life characteristics. In several of the compositions described in the '008 application, the amount of Co was reduced in an effort to lower the alloy cost and was replaced by Cu and other microstructure tuning elements in an effort to achieve superior low temperature performance characteristics. As illustrated in FIG. 1 hereinabove, however, it has been noted by the instant inventors that inclusion of Cu and/or removal of Co from the alloy composition may be detrimental to the cycle life characteristics of the alloy. The alloys of this example, however, show that substitution of Cu for Co in the presence of a cycle life enhancement element according to the instant invention provide low hysteresis, a condition indicative of good cycle life characteristics. Thus, deleterious effects associated with the removal of Co are compensated by the instant cycle life enhancement elements.

EXAMPLE 9

In this example, the particle size variation upon cycling of several of the instant alloys is presented. More specifically, the average particle size of the alloys after ten cycles of hydriding (absorption) and dehydriding (desorption) in the gas phase is given as a function of PCT hysteresis as measured by the maximum concentration difference. The experiment details are as follows: A piece of ingot (about 10 grams) from each composition in this study was placed into a hydrogen reactor. The reactor was first pumped and flushed with argon gas three times and the sample (ingot) was activated by cooling from 300° C. to room temperature under 50 psi hydrogen atmosphere. The sample was next subjected to 10 cycles of hydriding under 50 psi hydrogen atmosphere and dehydriding with a two-stage mechanical pump. Each cycle took about 5 hours to complete. After 10 gas phase cycles, the sample was moved to a laser particle size analyzer and a particle distribution curve was obtained. The average particle size was calculated by volume. The maximum concentration difference (MCD) values were obtained from the PCT curves of each sample.

Figure 11:
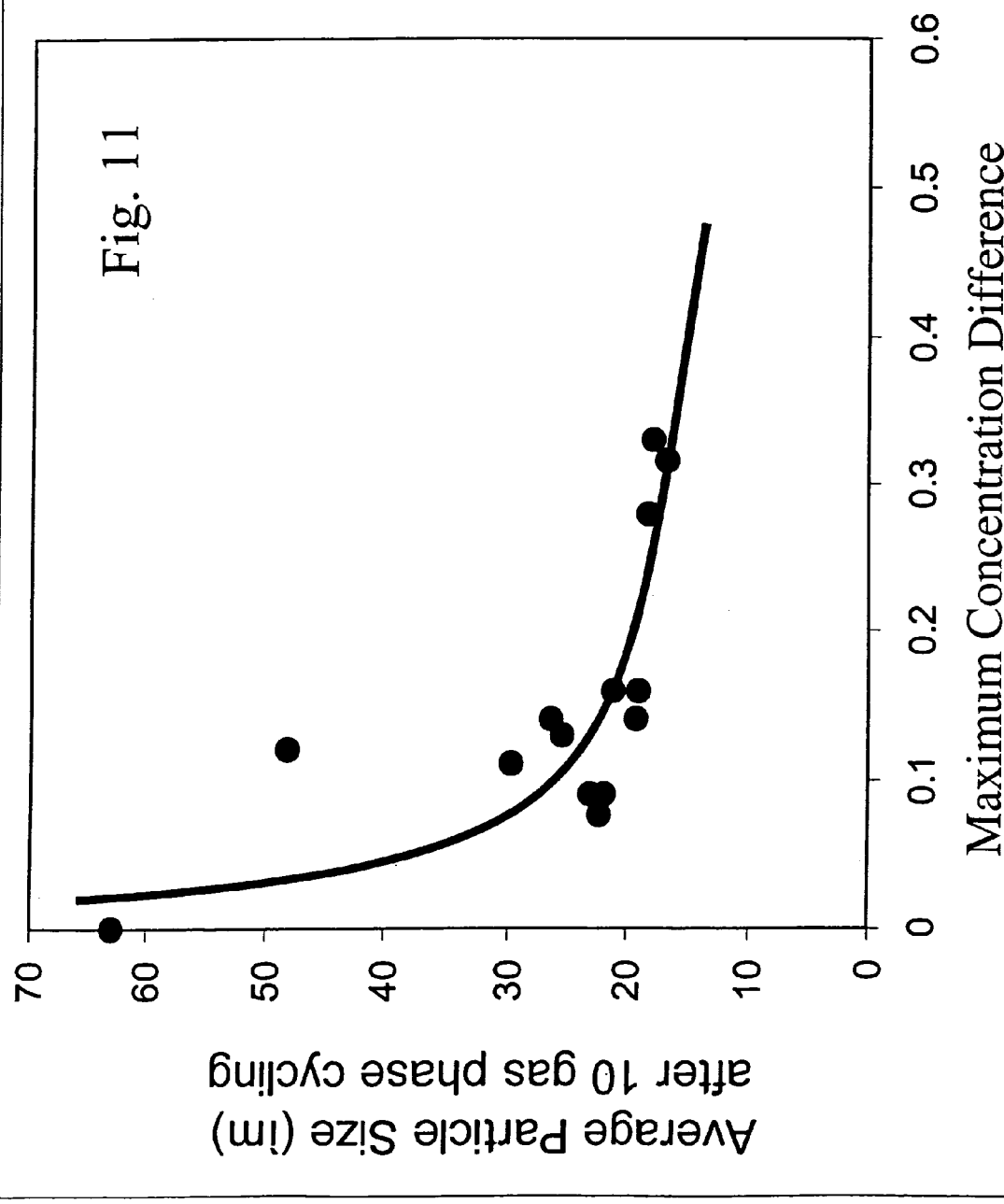
FIG. 11. Correlation of average particle size in microns after 10 gas phase cycles as a function of maximum concentration difference for several alloys.

The results obtained are given below and summarized in graphical form in FIG. 11. The average particle size is expressed in units of microns and MCD is expressed in units of weight percent (wt. %) absorbed hydrogen.

| Alloy | Average Particle Size (μm) | MCD (wt. %) |
|---|---|---|
| B | 22.45 | 0.075 |
| B0 | 18.28 | 0.28 |
| B1 | 16.68 | 0.315 |
| B23 | 48.3 | 0.12 |
| B12 | 17.81 | 0.33 |
| B4 | 21.9 | 0.09 |
| B24 | 26.41 | 0.14 |
| B27(l) | 21.12 | 0.16 |
| B26 | 25.56 | 0.13 |
| B27(h) | 23.14 | 0.09 |
| C36 | 29.79 | 0.11 |
| C37 | 63.06 | ~0 |
| B36 | 19.2 | 0.14 |
| B37 | 19 | 0.16 |

The results of this example show that metal hydride materials having a large maximum concentration difference exhibit greater pulverization and particle size degradation on cycling and vice versa for materials having a small maximum concentration difference. The results demonstrate the reliability of hysteresis, as measured by MCD, for determining the cycle life characteristics of metal hydride alloys. The results further show that alloys including Zr and Si as modifiers exhibit less pulverization and particle size degradation, attributes that are conducive to long cycle life.

EXAMPLE 10

In this example, the cycle life of batteries that includes the instant B22, B23, and B24 alloys are compared to the cycle life of a control battery containing the B13 alloy. A standard commercial C-cell battery design was used in the comparison of this example. The battery design included a negative electrode containing one of the hydrogen storage alloys used in this example, a nickel hydroxide positive electrode, a separator and a KOH electrolyte. Four batteries were used in the cycle life comparison. Each battery included a different hydrogen storage alloy as the active material in the negative electrode, but the batteries were otherwise identical in construction. The cycle life of each battery was tested to examine the stability of the battery capacity upon repeated cycles of charging and discharging. Charging of each battery was completed at a C/2 rate with negative $\Delta V$ as the method of charge termination. Under this method, charging was terminated when a 3 mV decrease in voltage was detected. Discharging of each battery was completed at a C/2 rate until the battery voltage decreased to 0.9 V. Each cycle of this example includes one charging step and one discharging step and is repeated until the battery capacity drops to less than 70% of its initial capacity.

Figure 12:
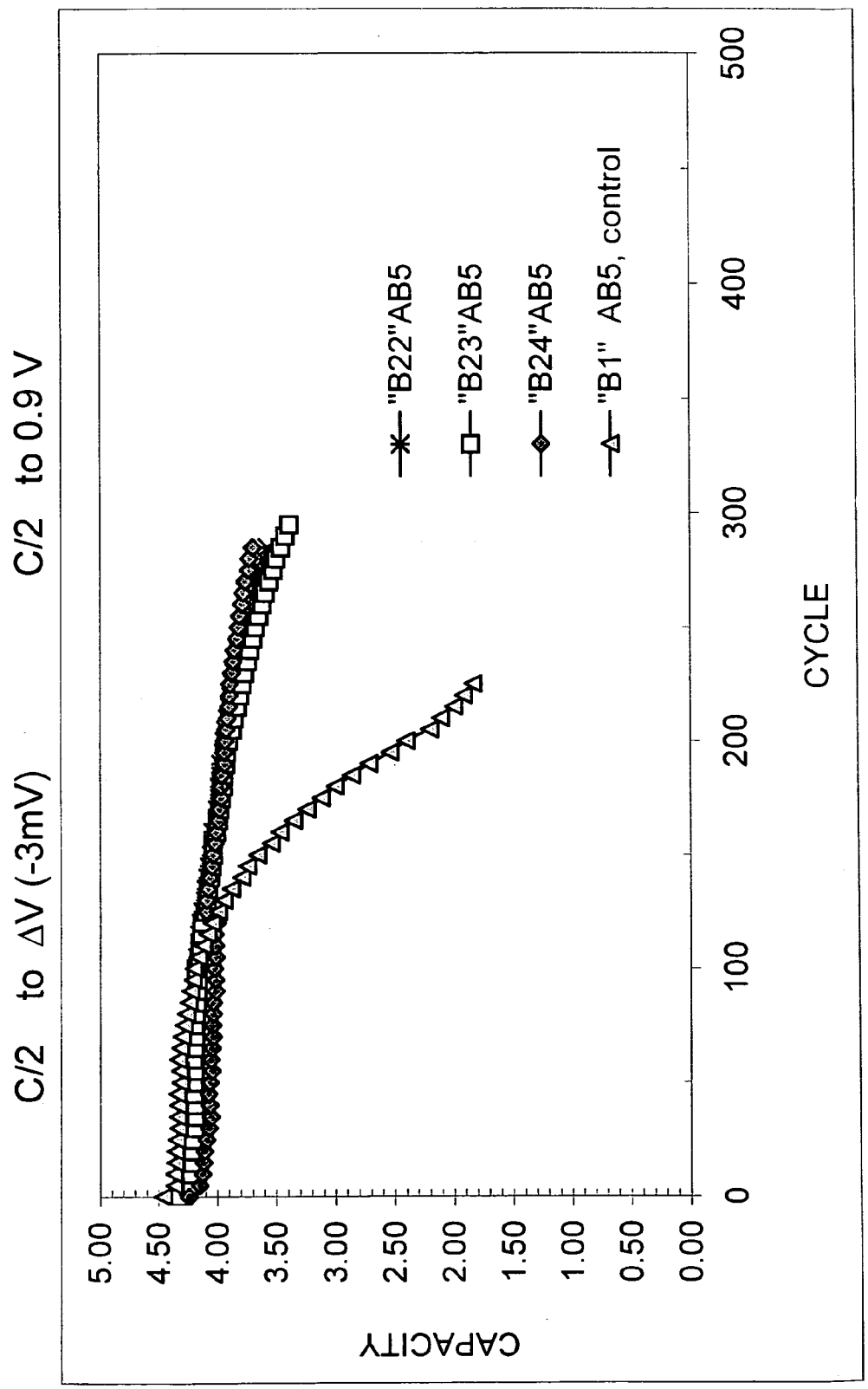
FIG. 12. Cycle life characteristics of the B1 alloy and the instant B23, B24, and B25 alloys.

The results of the cycle life tests are shown in FIG. 12 herein, which shows battery capacity (mA-h/g) as a function of cycle number. The cycle life testing shows a clear improvement in the cycle life characteristics of the B22, B23, and B24 alloys relative to the B1 alloy. Whereas the battery containing the B1 alloy has lost over 50% of its initial capacity by 200 cycles, batteries containing the B22, B23 and B24 alloys continue to exhibit ~75% or more of their initial capacity at 300 cycles. The results demonstrate that the instant cycle life enhancement elements improve cycle life characteristics in accordance with the discussion hereinabove.

EXAMPLE 11

In this example, low temperature performance characteristics of the instant B23 and B24 alloys are considered. The performance of a nickel metal hydride battery having a negative electrode containing the instant B23 and B24 alloys is described and compared to analogous batteries containing the B and B1 alloys as the negative electrode material. A nickel metal hydride C cell battery was constructed using each alloy and tested according to an HEV power test protocol. Except for the negative electrode material, the C cells were identical in design. Each C cell included a pasted negative electrode comprising one of the four alloys (B, B1, B23, and B24), a nickel hydroxide positive electrode on a nickel foam substrate, a KOH electrolyte and a fluorinated polypropylene/polyethylene separator. The specific power of each battery was measured using an HEV power test at 35° C. and −30° C. for state of charge (SOC) values of 100%, 80%, 50%, and 20%. Each state of charge (SOC) was reached by first charging to 100% SOC and then discharging at the C rate to the desired SOC. (The C rate corresponds to the discharge rate required to fully discharge the cell in one hour. The C rate of a 4 A-h battery, for example, is 4 A.) As the discharging at the C rate was concluding, the voltage of the battery at the C rate current was measured for each SOC to obtain an initial voltage and current at each SOC. The initial voltage and current are subsequently used in determining the specific power upon further discharge from the SOC. This further discharge of the battery from each SOC was accomplished by applying a 10 sec, 10C current pulse to the battery. At the end of the pulse, the voltage of the battery was measured. The specific power was then computed. The specific power computation included a calculation of $\Delta V/\Delta I$, relative to the initial voltage and current, to obtain a resistance, as well as determinations of the open circuit voltage ($V_{oc}$) and maximum current ($I_{max}$) of the battery. The specific powers reported in this example were calculated by computing the product ($\frac{2}{3}V_{oc}$) ($\frac{1}{3}I_{max}$) and normalizing to mass.

The results of the HEV power test at SOC values of 100%, 80%, 50% and 20% are shown in FIG. 13 herein. The specific power of the four different batteries are shown, using the symbols indicated in FIG. 13 for batteries based on the B, B1, B23, and B24 alloys. At 35° C., the specific powers of the four batteries are comparable. The battery based on the B1 alloy exhibits a slightly higher specific power than the batteries based on the B, B23 and B24 alloys. All of the batteries, however, show acceptable specific power at 35° C. over a wide range of SOC.

At −30° C., the batteries based on the B23 and B24 alloys show markedly superior performance. The battery based on the conventional B alloy loses all power when the SOC is reduced to 80%. The battery based on the B1 alloy shows the highest power at 100% and 80% SOC, but rapidly loses power as the SOC is further reduced. At 50% SOC, the specific power of the battery based on the B1 alloy is essentially zero. Batteries based on the instant B23 and B24 alloys, in contrast exhibit specific powers above 150 W/kg at 50% SOC and continue to deliver power down to 20% SOC.

The improved specific power of batteries based on the instant alloys at low temperature is significant because it enables the practical use of nickel metal hydride batteries in heretofore inaccessible operating environments. Design considerations for HEVs reveal a preference for batteries operating at less than 100% state of charge to achieve favorable regenerative braking characteristics. Current commercial HEVs, for example, utilize batteries at 50% state of charge. The data of this example clearly indicate the suitability of batteries based on the instant alloys for use at low temperatures at all states of charge, especially at states of charge of 70% or less and most especially at states of charge of 50% or less. The excellent low temperature characteristics of the instant alloys in combination with the excellent cycle life and resistance to pulverization described in EXAMPLES 9 and 10 hereinabove demonstrate the superiority of the instant metal hydrides.

In a further demonstration of the suitability of the instant alloys for HEV applications, the instant inventors constructed nickel metal hydride battery modules and determined the specific peak power thereof. Separate modules utilizing the B, B1, B12, B23 and B24 alloys were constructed. The alloys were fabricated into negative electrodes and included in cells that were interconnected to form the modules. Each module included ten interconnected cells in a water-cooled sealed prismatic design with a nominal C-rate capacity of 9 Ah. For each module, the specific peak power (in units of W/kg) was measured at 35° C. using a 100 A current pulse applied for 10 sec. The results are summarized in the table below:

| Alloy | Weight (kg) | Specific Peak Power (W/kg) | C-rate Capacity (Ah) |
|---|---|---|---|
| B | 2.470 | 935 | 8.9 |
| B1 | 2.450 | 1237 | 8.9 |
| B12 | 2.385 | 1373 | 9.0 |
| B23 | 2.462 | 1131 | 8.7 |
| B24 | 2.450 | 1135 | 8.7 |

The specific peak power results for the sealed prismatic HEV modules show that the modules that include the instant B23 and B24 alloys exhibit significantly improved peak powers relative to the module based on the conventional B alloy. The B1 and B12 modules exhibited the greatest peak powers, but as described hereinabove, these alloys are susceptible to cycle life degradation. The high specific powers of the B23 and B24 modules in combination with the improved cycle life characteristics described hereinabove make these alloys on balance a superior choice for HEV applications.

EXAMPLE 12

In this example, the half-cell capacity of electrodes fabricated from several of the instant alloys was determined. The half-cell capacity is a measure of the intrinsic ability of an electrode material to store hydrogen in an electrochemical reaction. Each test electrodes was fabricated by pressing an alloy powder onto an expanded nickel substrate without utilizing a binder. Test electrodes were prepared from the B, B0, B1, B12, B21, B22, B23, B24, B25, B26, B27, and B28 alloys. Each of the test electrodes was tested in an electrochemical cell that included an over-capacity, partially charged $Ni(OH)_2$ counterelectrode and a 30% KOH electrolyte. In the half-cell capacity test, the voltage between the test electrode and counterelectrode was recorded. The half-cell capacity was measured using a constant current charge-discharge station. The charge rate was 100 mA/g for 6 hours and separate tests using different discharge rates (50 mAh/g and 5 mAh/g) were completed. The half-cell capacities measured at the two discharge rates were averaged and are reported in the table below:

| Alloy | Half-Cell Capacity (mAh/g) |
|---|---|
| B | 327 |
| B0 | 316 |
| B1 | 325 |
| B12 | 314 |
| B21 | 304 |
| B22 | 307 |
| B23 | 302 |
| B24 | 304 |
| B25 | 319 |
| B26 | 318 |
| B27 | 303 |
| B28 | 289 |

The half-cell capacity results indicate that the instant alloys compare favorably to conventional alloys. The similar half-cell capacities of the instant alloys with established alloys are indicative of their suitability for batteries and other electrochemical hydrogen storage applications. The half-cell capacities of the instant alloys attest to their favorable hydrogen storage capabilities and functionality as hydrogen storage alloys. In one embodiment herein, the half-cell capacity of the instant alloys is at least 100 mAh/g. In a preferred embodiment, the half-cell capacity is at least 200 mAh/g. In a more preferred embodiment, the half-cell capacity is at least 300 mAh/g.

EXAMPLE 13

In this example, the charge transfer resistances and double layer capacitances of roll-compacted electrodes that include the instant B21, B22, B23, and B24 alloys are compared to an analogous electrode that includes the B1 alloy at −30° C. The B1 alloy was selected as a basis of comparison because of the superior low temperature characteristics demonstrated for it in the '008 application.

The charge transfer resistance ($R_{CT}$) and double layer capacitance ($C_{dl}$) of the batteries were obtained through complex impedance measurements. The impedance measurements were completed using an electrochemical cell that included a mercury/mercury oxide reference electrode, a nickel hydroxide counter electrode, a working electrode that included one of the B1, B21, B22, B23 or B24 alloys, and a 30% KOH electrolyte. Impedance measurements were completed at 23° C. and −30° C.

Figure 14:
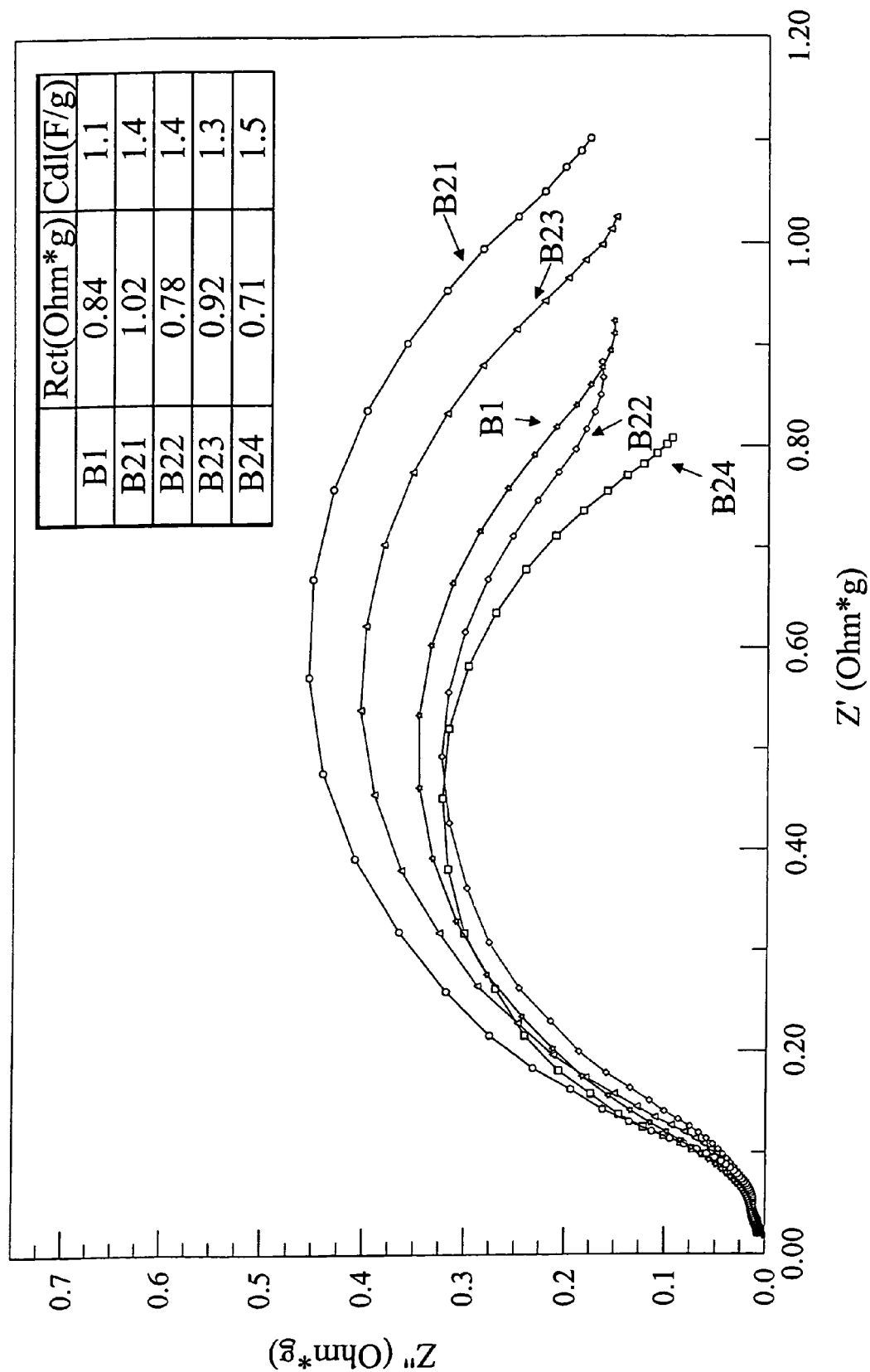
FIG. 14. Comparison of the complex impedance plots at –30° C. of compacted electrodes that include the B1 and instant B21, B22, B23, and B24 alloys.

The results of the measurements at −30° C. are presented in FIG. 14 herein which shows the imaginary part $Z''$ of the complex impedance as a function of the real part $Z'$ of the complex impedance. The curves are labeled according to the alloy used as the negative electrode material. Each curve includes a semi-circular portion and an upwardly sloping portion. The intercept of each curve with the $Z'$ axis provides the Ohmic resistance of each battery. The charge transfer resistance can be determined from the diameter of the semi-circular portion of each curve and the slope of the upwardly sloping portion of each curve is related to the diffusion resistance. The double layer capacitance can be obtained from the standard electrochemical equations used in the analysis of the semicircular portion of each curve. The values of $R_{CT}$ and $C_{dl}$ computed from the complex impedance curve of each alloy are shown in the inset of FIG. 14. In one embodiment herein, the charge transfer resistance is less than 2 ohm-g. In a preferred embodiment, the charge transfer resistance is less than 1.5 ohm-g. In a more preferred embodiment, the charge transfer resistance is less than 1 ohm-g.

The results show that the charge transfer resistances $R_{CT}$ of the five alloys are similar. Since the electrochemical cell used in the measurements were analogous except for the choice of negative electrode material, the value of $R_{CT}$ is indicative of differences in the kinetics of the charge transfer reaction that occurs at the negative electrode for the different alloy materials. As described in the '008 application, the charge transfer resistance associated with B1 alloy is lower than that associated with a conventional commercial B alloy and as a result, the charge transfer reaction at the B1 electrode proceeds with faster kinetics than the charge transfer reaction at the B electrode. The results of this example show that similarly favorable charge transfer characteristics are associated with the instant alloys at −30° C. The faster kinetics relative to conventional alloys indicate a more favorable electrochemical reaction and suggest that the instant alloys benefit from the effects associated with a greater porosity for the support matrix surrounding the catalytic metallic particles and/or a greater number density of catalytic metallic particles in the interface region as described in the '008 application. Low charge transfer resistance is conducive to improved power capability.

Electrodes based on the instant B21, B22, B23 and B24 alloys exhibit a larger double layer capacitance than the electrode based on the B1 alloy. Since the double layer capacitance is indicative of the surface area over which an electrochemical reaction occurs and since high surface area is conducive to greater electrochemical reactivity, the results of this example indicate that the low temperature electrochemical reactivity of the instant B21, B22, B23, and B24 alloys is better than that of the B1 alloys. The measurements at 23° C. indicate that the B21, B22, B23, and B24 alloys have comparable charge transfer resistances and double layer capacitances to the B1 alloy. The performance of the instant alloys at 23° C. is thus not compromised relative to the B1 alloy. The results of this example therefore demonstrate that the instant alloys maintain low temperature characteristics that are comparable to or superior to those of the B1 alloys while retaining similar room temperature characteristics. In particular, the complex impedance results of this example indicate faster discharge kinetics and higher specific powers at low operating temperatures for batteries that include negative electrodes containing the instant alloys.

EXAMPLE 14

In this example, the pore resistances of the instant B21, B22, B23, and B24 alloys are presented and compared to that of the B1 alloy. Pore resistance is a measure of the facility of electrochemical reaction within a porous electrode material. It is influenced by factors such as the volume and/or dimensions of voids or channels present within the electrode material. Voids and channels provide the pathways needed for the migration or diffusion of electrochemically reactive species within the electrode material. Accessibility of electrochemically reactive species to the catalytic sites within a metal hydride electrode is necessary for efficient charging and discharging of the electrode. Pore resistance provides a measure of the mobility of electrochemical species within the metal hydride material and provides an indication of the expected efficiency of electrochemical reaction. A low pore resistance signifies high mobility of electrochemical species and is conducive to fast reaction kinetics and efficient reactions.

In the '008 application, the pore resistances of the B1 and B12 alloys were determined and shown to be much lower at −30° C. and −5° C. than the pore resistance of a conventional B0 alloy. This finding evidences the superior low temperature performance of the B1 and B12 alloys of the '008 application relative to conventional commercial alloys such as the B0 alloy. In this example, the pore resistance of the B21, B22, B23, and B24 alloys is determined and compared to that of the B1 alloy.

Figure 16:
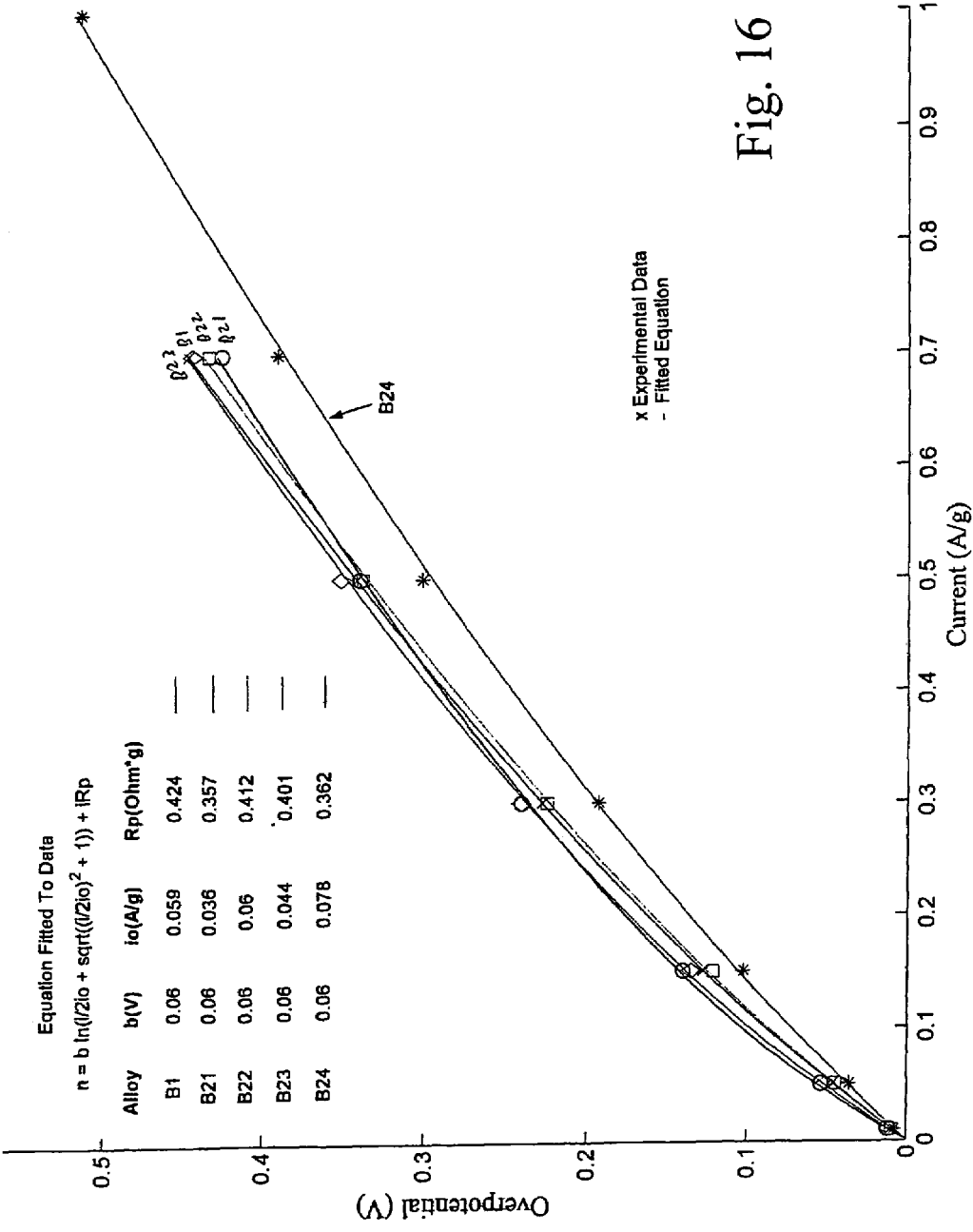
FIG. 16. Comparison of the overpotential as a function of discharge current at –30° C. of compacted electrodes that include the B1, and instant B21, B22, B23, and B24 alloys.

The pore resistance was obtained from measurements of the polarization curves of electrodes fabricated from different metal hydride electrodes. Separate electrodes were fabricated using the B1, B21, B22, B23, and B24 alloys. The polarization curves of the five alloys are shown in FIG. 16. The polarization curves were obtained at 80% SOC by pulsating the electrodes to different currents (at 80% SOC) and measuring the electrode potential (relative to a Hg/HgO reference electrode in an electrochemical cell that also included a nickel hydroxide counter electrode and a KOH electrolyte) 10 seconds after initiation of the pulse. The potential measured is referred to as the overpotential of the electrode and is plotted as a function of current pulse amplitude in FIG. 16. The overpotential is a measure of the displacement of an electrode from its equilibrium potential in response to an applied current. A lower overpotential at a given applied current generally indicates greater facility (e.g. faster kinetics, less energy dissipation) of a particular electrochemical reaction.

Analysis of the overpotential variation with current was completed using a modified form of the Butler-Volmer equation that accounts for porosity. Conventionally, Butler-Volmer analysis of electrode overpotential is based on a smooth electrode approximation in which the sites of electrochemical reactivity are located directly at the electrode surface so that the electrode presents no mobility barriers to reaction. In the instant electrodes, however, the surfaces are not smooth, but rather are porous, with barriers to mobility as described hereinabove. Consequently, it is desired to include the effects of porosity on the overpotential. The modified form of the Butler-Volmer equation adapted for analysis of the overpotential data of this example is the following:

$$\eta = b\ln\left[\frac{i}{2i_0} + \sqrt{\left(\frac{i}{2i_0}\right)^2 + 1}\right] + iR_p$$

where $\eta$ is the overpotential, b is a Tafel constant (divided by 2.3 to account for a transformation from common to natural logarithms), $i_0$ is the exchange current density, i is the applied current density, and $R_p$ is the pore resistance. The term $iR_p$ accounts for the contribution of the pore resistance to the overpotential.

The value of $R_p$ reflects the influence of porosity oh overpotential at a particular current. The value of $R_p$ is determined by the microstructure of the electrode material and the characteristics of the electrochemically relevant species that must penetrate the microstructure in order to effect reaction. An open, porous microstructure provides little inhibition to the mobility of chemical species at or in the vicinity of the electrode surface and/or catalytic sites of reactivity or to the mobility of conductive ionic species through the electrode. As a result, a porous microstructure is conducive to a small pore resistance. A dense microstructure, particularly one that has sites of electrochemical reactivity away from the surface, provides a substantial barrier to mobility and is conducive to a large pore resistance. For a particular microstructure, pore resistance may also depend on the size, shape, charge and other characteristics of the electrochemically relevant species that must penetrate the microstructure in order to undergo reaction.

The overpotential as a function of current data presented in FIG. 16 was fit using the above equation. The results of the fits are indicated as solid curves in FIG. 16. The fitting provides values of the Tafel constant, exchange current density and pore resistance (in units of ohm-g) of each electrode at the three measurement temperatures. The pore resistance results are summarized below:

| Electrode Alloy | Temperature | $R_p$ (Ω-g) |
|---|---|---|
| B1  | −30° C. | 0.424 |
| B21 | −30° C. | 0.357 |
| B22 | −30° C. | 0.412 |
| B23 | −30° C. | 0.401 |
| B24 | −30° C. | 0.362 |

The pore resistance results indicate that the pore resistances of electrodes based on the instant alloys are lower than the pore resistance of an electrode based on the B1 alloy. The lower pore resistance of the instant alloys indicates that electrochemical reactions of the alloys occur at least as favorably as electrochemical reactions of the B1 alloy. The lower pore resistance indicates a lower mobility barrier and greater accessibility for electrochemically active species with respect to the catalytic metallic particles of the instant alloys as well as a lower mobility barrier for conductive ionic species within or through electrodes formed from the instant alloys. In one embodiment herein, the pore resistance at −30° C. is less than 1 ohm-g. In a preferred embodiment, the pore resistance at −30° C. is less than 0.75 ohm-g. In a more preferred embodiment, the pore resistance at −30° C. is less than 0.5 ohm-g.

EXAMPLE 15

In this example, the surface metallic nickel content of the instant B21, B22, B23 and B24 alloys is measured and compared to the metallic nickel content of the B and B1 alloys. As described in the '008 application and references incorporated by reference therein and herein, the performance of metal hydride materials is promoted through the formation of a high density of catalytic nickel (or other metal or metal alloy) particles in the interface region of a metal hydride or hydrogen storage material. A high density of catalytic nickel particles in combination with a high porosity for the support matrix surrounding the catalytic nickel particles promotes electrochemical (or thermal) reactivity by improving access of reactant species to and product species away from catalytic sites and by providing a large number of such sites. These effects are described in the '008 application and are enhanced through an accelerated and directed preferential corrosion effect described therein. Also, as described hereinabove and in the '088 patent, the density of catalytic nickel particles may also be increased through activation.

The catalytic nickel particles are comprised of metallic nickel atoms and can be quantified indirectly through a magnetic susceptibility measurement. The magnetic susceptibility measurements of this example were completed with a MicroMag 2900 alternating gradient magnetometer from Princeton Measurements Corporation. Since the magnetic susceptibility of bulk $AB_5$ alloys are typically very small compared to that from metallic nickel created when surface oxide was formed, the magnetic susceptibility can be used as an indirect measurement of surface metallic nickel where a higher surface metallic nickel concentration correlates with a higher magnetic susceptibility. Samples of the alloys were etched with 60% KOH water solution at 100° C. for two hours before the measurement. The curve of saturated magnetic momentum vs. applied magnetic field can be fit with an analytic model to determine the magnetic domain size.

Figure 15:
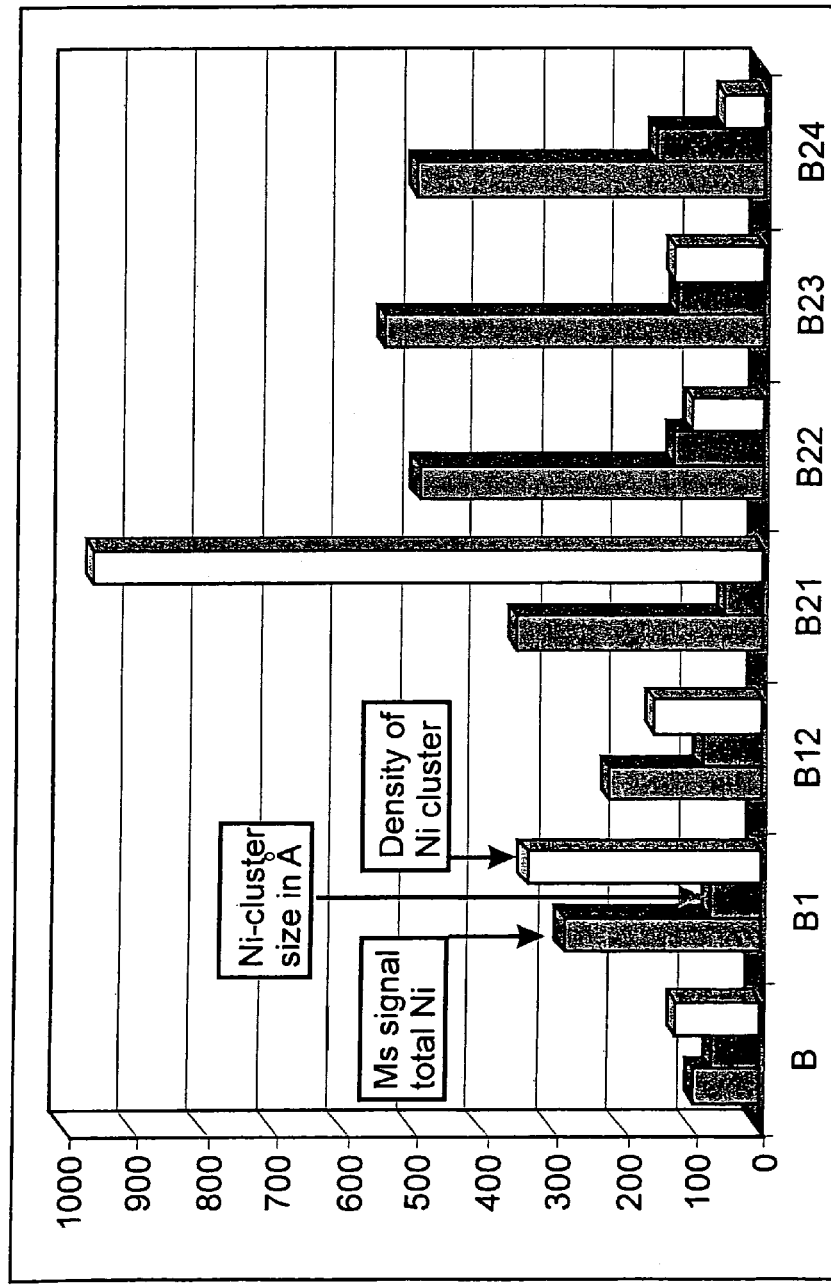
FIG. 15. Magnetic susceptibility, cluster size and cluster density of activated forms of the B, B1, B12, and instant B21, B22, B23, and B24 alloys.

Magnetic susceptibility measurements (in units of memu/g) along with determinations of the average cluster size (in units of Å) of the metallic nickel particles in the surface region and the density (uncalibrated (relative units)) of the metallic Ni clusters (particles) in the surface region are summarized in FIG. 15. In order to simultaneously present magnetic susceptibility, average cluster size and cluster density, the data is plotted with respect to a relative ordinate axis. Actual values are given in the table below:

| Alloy | Mag. Susc. (memu/g) | Average Cluster Size (Å) | Cluster Density (uncalibrated) |
|---|---|---|---|
| B | 98 | 73 | 25.2 |
| B1 | 285 | 75 | 67.6 |
| B12 | 222 | 89 | 31.5 |
| B21 | 356 | 57 | 192.2 |
| B22 | 496 | 133 | 21.1 |
| B23 | 547 | 127 | 26.7 |
| B24 | 501 | 160 | 12.2 |

The magnetic susceptibility results indicate that the instant alloys contain a higher amount of metallic nickel than the conventional B alloy and the B1 and B12 alloys of the '008 application. Inclusion of the instant cycle life enhancement elements is thus shown to facilitate the formation of metallic nickel and to increase the density of catalytic nickel particles commensurately. In one embodiment herein, the magnetic susceptibility is greater than 250 memu/g. In a preferred embodiment, the magnetic susceptibility is greater than 400 memu/g. In a more preferred embodiment, the magnetic susceptibility is greater than 525 memu/g.

While not wishing to be bound by theory, the results suggest that the instant cycle life enhancement elements may enhance the accelerated and directed preferential corrosion effect described in the '008 application as being conducive to the formation of metallic nickel particles and may do so in such a way as to minimize the gradient in the concentration of absorbed hydrogen that develops in the material upon electrochemical charging. Such an argument is consistent with the formation of an open, porous network of channels and voids in the interface region of a metal hydride material, as described hereinabove and in the '008 application, which is extended to a more pronounced degree through the inclusion of the instant cycle life enhancement elements. As the support matrix surrounding the catalytic particles becomes increasingly porous, the resistance to mobility for absorbed hydrogen decreases and the tendency for a more uniform concentration of absorbed hydrogen increases. The lower pore resistances described hereinabove in EXAMPLE 14 for the instant alloys is consistent with the view that the instant cycle life enhancement elements either enhance or at least do not significantly detract from the accelerated and directional preferential corrosion effect described in the '008 application. The instant inventors further recognize, however, that mechanisms and effects unique to the instant alloys that are independent of or complementary to accelerated and directional preferential corrosion may be operable.

The additional results on the distribution of metallic nickel in the alloys indicate that metallic nickel is present in the form of clusters and that the density of Ni clusters is lower in the B22, B23, and B24 alloys than in the B1 and B12 alloys of the '008 application. This result is consistent with a more porous, less dense interface region and further suggests, since the metallic nickel content is higher in the B22, B23, and B24 alloys, that these alloys may have a thicker interfacial region than the B1 and B12 alloys. This effect is one factor that would promote a more uniform distribution of hydrogen in the metal hydride alloy and is consistent with the reduced pulverization observed for the instant alloys.

The instant invention provides thermal and electrochemical hydrogen storage materials as well as electrodes, batteries, fuel cells etc. constructed therefrom that offer superior power, especially at low temperatures, and excellent cycle life. A reduction in cost is an added benefit of the instant alloys as excellent cycle life characteristics are obtained while minimizing the Co content of the alloys. Replacement of Co is desirable since Co is one of the most expensive components in practical $AB_5$ alloys. Co has typically been included in prior art alloys to suppress pulverization and improve the cycle life. In several of the instant alloys, a low temperature power enhancement element such as Cu replaces a portion of the Co present in an $AB_5$ composition and the deleterious effect of reducing the Co content on cycle life is ameliorated by inclusion of a cycle life enhancement element such as Zr or Si. The cycle life enhancement element improves alloy performance by reducing hysteresis (measured, for example, through the maximum concentration difference of the alloy) and pulverization as described hereinabove. In a preferred embodiment, the maximum concentration difference is less than 0.25 wt. % absorbed hydrogen. In another preferred embodiment, the maximum concentration difference is less than 0.20 wt. % absorbed hydrogen. In a more preferred embodiment, the maximum concentration difference is less than 0.15 wt. % absorbed hydrogen. In a most preferred embodiment, the maximum concentration difference is less than 0.10 wt. % absorbed hydrogen. The instant alloys thus simultaneously exhibit excellent low temperature power characteristics, excellent cycle life, and reduced Co content. In a preferred embodiment, the Co concentration does not exceed 9 at. %. In a more preferred embodiment, the Co concentration does not exceed 7 at. %. In most preferred embodiment, the Co concentration does not exceed 5 at. %.

The low hysteresis, low pulverization and long cycle life characteristics of the instant alloys arise from the low mass concentration difference of the materials. It is of course a requirement of the instant invention that the instant alloys absorb hydrogen so that non-absorbing materials are outside of the scope of the instant invention even though they may have a low (or zero) mass concentration difference. A zero value of the mass concentration difference may occur in the ideal situation of a hydrogen absorbing material exhibiting no activation barrier to the incorporation of hydrogen as well as in a non-functioning (i.e. non-hydrogen absorbing) material. Other characteristics such as power, half-cell capacity, activation, magnetic susceptibility, cycle life, battery capacity etc. as described hereinabove denominate functional hydrogen absorbing materials. In one embodiment herein, the mass concentration difference is greater than zero. Functional and non-functional hydrogen storage alloys may further be distinguished through the maximum reversible hydrogen storage concentration described hereinabove. Non-functional alloys have a negligible maximum reversible hydrogen storage concentration, while functional alloys have an appreciable hydrogen storage concentration.

The results of the foregoing examples indicate that the instant alloys have low temperature performance characteristics comparable to those of the B1 and other alloys of the '008 application and that the favorable low temperature characteristics have been maintained in alloys having a reduced Co concentration and long cycle life.

The disclosure and discussion set forth herein is illustrative and not intended to limit the practice of the instant invention. Numerous equivalents and foreseeable variations thereof are envisioned to be within the scope of the instant invention. It is the following claims, including all equivalents, in combination with the foregoing disclosure, which define the scope of the instant invention.

We claim:

1. A hydrogen storage alloy having a bulk region and an interface region, said interface region comprising catalytic metallic particles supported by a support matrix and voids, said catalytic metallic particles having diameters of less than about 100 Å, said catalytic metallic particles and said voids being distributed throughout said interface region, the volume fraction of said voids in said interface region being greater than 5%, said alloy having a half-cell capacity of at least 100 mAh/g and a maximum concentration difference of less than 0.25 wt. % absorbed hydrogen.

2. The hydrogen storage alloy of claim 1, wherein said alloy comprises La, Ni, Co, and Cu.

3. The hydrogen storage alloy of claim 2, wherein said alloy further comprises Zr or Si.

4. The hydrogen storage alloy of claim 1, wherein said interface region includes an oxygen concentration of at least 10%.

5. The hydrogen storage alloy of claim 1, wherein said catalytic metallic particles comprise nickel.

6. The hydrogen storage alloy of claim 1, wherein said catalytic metallic particles have diameters of less than 50 Å.

7. The hydrogen storage alloy of claim 1, wherein the volume fraction of said catalytic metallic particles in said interface region is greater than 30%.

8. The hydrogen storage alloy of claim 1, wherein the volume fraction of said catalytic metallic particles in said interface region is greater than 50%.

9. The hydrogen storage alloy of claim 1, wherein said catalytic metallic particles vary in proximity from 50-100 Å in said interface region.

10. The hydrogen storage alloy of claim 1, wherein said volume fraction of said voids in said interface region is greater than 10%.

11. The hydrogen storage alloy of claim 1, wherein said volume fraction of said voids in said interface region is greater than 20%.

12. The hydrogen storage alloy of claim 1, wherein said voids are channels.

13. The hydrogen storage alloy of claim 12, wherein said channels have a cross-sectional dimension of 10-20 Å.

14. The hydrogen storage alloy of claim 12, wherein said channels have a longitudinal dimension of greater than about 20 Å.

15. The hydrogen storage alloy of claim 1, wherein said bulk region has a $CaCu_5$ crystal structure.

16. The hydrogen storage alloy of claim 1, wherein said alloy has a half-cell capacity of at least 200 mAh/g.

17. The hydrogen storage alloy of claim 1, wherein said alloy has a half-cell capacity of at least 300 mAh/g.

18. The hydrogen storage alloy of claim 1, wherein the concentration of Co in the alloy does not exceed 9 at. %.

19. The hydrogen storage alloy of claim 18, wherein said alloy has a half-cell capacity of at least 200 mAh/g.

20. The hydrogen storage alloy of claim 18, wherein said alloy has a half-cell capacity of at least 300 mAh/g.

21. The alloy of claim 1, wherein said alloy comprises a mischmetal, said mischmetal including said lanthamide element.

22. The alloy of claim 1, wherein said further comprises a cycle life enhancement element, said cycle life enhancement element being selected from the group consisting of Zr, Sc, Ca, Mg, Ti, V, Cr, and Si.

23. The alloy of claim 22, wherein said cycle life enhancement element is Zr.

24. The alloy of claim 22, wherein the concentration of said cycle life enhancement element is between 0.2 and 1.7 at. %.

25. The alloy of claim 22, wherein the concentration of said cycle life enhancement element is between 0.2 and 1.7 at. %.

26. The alloy of claim 22, wherein the concentration of said cycle life enhancement element is between 0.5 and 1.1 at. %.

27. The alloy of claim 22, wherein said alloy further comprises Cu.

28. The alloy of claim 27, wherein the concentration of Cu is at least 1.5 at. %.

29. The alloy of claim 27, wherein the concentration of Cu is at least 3 at. %.

30. The alloy of claim 1, wherein said alloy further comprises Mn.

31. The alloy of claim 1, wherein said alloy further comprises Al.

32. The alloy of claim 18, wherein the concentration of Co does not exceed 7 at. %.

33. The alloy of claim 18, wherein the concentration of Co does not exceed 5 at. %.

34. The alloy of claim 18, wherein the concentration of Co does not exceed 3 at. %.

35. The alloy of claim 1, wherein said alloy has a maximum concentration difference of less than 0.20 wt. % absorbed hydrogen.

36. The alloy of claim 1, wherein said alloy has a maximum concentration difference of less than 0.15 wt. % absorbed hydrogen.

37. The alloy of claim 1, wherein said alloy has a maximum concentration difference of less than 0.10 wt. % absorbed hydrogen.

38. The alloy of claim 1, wherein said alloy has a magnetic susceptibility of at least 250 memu/g.

39. The alloy of claim 1, wherein said alloy has a magnetic susceptibility of at least 400 memu/g.

40. The alloy of claim 1, wherein said alloy has a magnetic susceptibility of at least 525 memu/g.

41. The alloy of claim 1, wherein said alloy further comprises Si.

* * * * *